United States Patent
Hong et al.

(10) Patent No.: US 8,231,218 B2
(45) Date of Patent: Jul. 31, 2012

(54) WETTABLE SILICONE HYDROGEL CONTACT LENSES AND RELATED COMPOSITIONS AND METHODS

(75) Inventors: Ye Hong, Pleasanton, CA (US); Charlie Chen, San Ramon, CA (US); Nick Manesis, San Ramon, CA (US)

(73) Assignee: Coopervision International Holding Company, LP, St. Michael (BB)

( * ) Notice: Subject to any disclaimer, the term of this patent is extended or adjusted under 35 U.S.C. 154(b) by 397 days.

(21) Appl. No.: 11/761,332

(22) Filed: Jun. 11, 2007

(65) Prior Publication Data

US 2007/0296914 A1 Dec. 27, 2007

Related U.S. Application Data

(60) Provisional application No. 60/804,911, filed on Jun. 15, 2006, provisional application No. 60/887,513, filed on Jan. 31, 2007, provisional application No. 60/894,609, filed on Mar. 13, 2007.

(51) Int. Cl.
- *G02B 1/04* (2006.01)
- *C08F 290/04* (2006.01)
- *C08F 230/08* (2006.01)
- *C08F 283/12* (2006.01)
- *G02C 7/04* (2006.01)

(52) U.S. Cl. .......... 351/160 H; 523/106; 523/107; 351/160 R; 424/429; 526/279; 524/865

(58) Field of Classification Search .......... 523/106, 523/107; 351/160 H, 160 R; 623/6.56, 6.6; 424/429; 526/279; 524/865
See application file for complete search history.

(56) References Cited

U.S. PATENT DOCUMENTS

| | | | |
|---|---|---|---|
| 4,711,943 A | 12/1987 | Harvey, III | |
| 5,260,000 A | 11/1993 | Nandu et al. | |
| 5,274,008 A | 12/1993 | Lai | |
| 5,352,714 A | 10/1994 | Lai et al. | |
| 5,358,995 A | 10/1994 | Lai et al. | |
| 5,451,617 A | 9/1995 | Lai et al. | |
| 5,486,579 A | 1/1996 | Lai et al. | |
| 5,610,252 A | 3/1997 | Bambury et al. | |
| 5,760,100 A | 6/1998 | Nicolson et al. | |
| 5,965,631 A * | 10/1999 | Nicolson et al. | 523/106 |
| 5,998,498 A | 12/1999 | Vanderlaan et al. | |
| 6,187,835 B1 | 2/2001 | Szum et al. | |

(Continued)

FOREIGN PATENT DOCUMENTS

EP 0 395 583 B1 10/1990

(Continued)

OTHER PUBLICATIONS

Hughes, D. E. Anal. Chem. 1983, 55, 78-81. American Chemical Society.*

(Continued)

*Primary Examiner* — Michael Pepitone
(74) *Attorney, Agent, or Firm* — Kilyk & Bowersox, P.L.L.C.

(57) ABSTRACT

Silicone hydrogel contact lenses having ophthalmically acceptable surface wettabilities are obtained from pre-extracted polymerized silicone hydrogel contact lens products having relatively large amounts of removable or extractable materials. The silicone hydrogel contact lenses can be obtained from non-polar resin based contact lens molds and without surface treatments or an interpenetrating polymeric network of a polymeric wetting agent. Related lens products, polymerizable compositions, and methods are also described.

56 Claims, 1 Drawing Sheet

U.S. PATENT DOCUMENTS

| | | | |
|---|---|---|---|
| 6,367,929 | B1 | 4/2002 | Maiden et al. |
| 6,420,453 | B1 | 7/2002 | Bowers et al. |
| 6,465,538 | B2 * | 10/2002 | Lai ............................ 522/64 |
| 6,533,415 | B2 * | 3/2003 | Watanabe ............... 351/160 H |
| 6,638,991 | B2 | 10/2003 | Baba et al. |
| 6,649,722 | B2 | 11/2003 | Rosenzweig et al. |
| 6,822,016 | B2 | 11/2004 | McCabe et al. |
| 6,849,671 | B2 | 2/2005 | Steffen et al. |
| 6,867,245 | B2 | 3/2005 | Iwata et al. |
| 7,052,131 | B2 | 5/2006 | McCabe et al. |
| 7,540,609 | B2 * | 6/2009 | Chen et al. ............. 351/160 R |
| 2002/0016383 | A1 | 2/2002 | Iwata et al. |
| 2003/0109637 | A1 | 6/2003 | Kunzler et al. |
| 2003/0152786 | A1 * | 8/2003 | Lewis et al. ................ 428/447 |
| 2003/0162862 | A1 * | 8/2003 | McCabe et al. ............. 523/106 |
| 2004/0039077 | A1 * | 2/2004 | Baba et al. ................... 522/99 |
| 2004/0186248 | A1 * | 9/2004 | Vanderlaan et al. ......... 525/474 |
| 2004/0192872 | A1 * | 9/2004 | Iwata et al. .................... 528/25 |
| 2005/0013842 | A1 * | 1/2005 | Qiu et al. ..................... 424/423 |
| 2005/0059770 | A1 | 3/2005 | Srinivasan et al. |
| 2006/0063852 | A1 | 3/2006 | Iwata et al. |
| 2006/0131769 | A1 | 6/2006 | Rastogi et al. |
| 2006/0142410 | A1 | 6/2006 | Baba et al. |
| 2006/0142525 | A1 | 6/2006 | Lai et al. |
| 2007/0037944 | A1 * | 2/2007 | Almond et al. ............... 526/264 |
| 2007/0066706 | A1 | 3/2007 | Manesis et al. |
| 2007/0291223 | A1 | 12/2007 | Chen et al. |
| 2008/0048350 | A1 | 2/2008 | Chen et al. |
| 2009/0018233 | A1 | 1/2009 | Nunez et al. |

FOREIGN PATENT DOCUMENTS

| | | |
|---|---|---|
| EP | 0 819 258 B1 | 1/1998 |
| EP | 0 989 418 A2 | 3/2000 |
| EP | 1 752 058 A1 | 2/2007 |
| EP | 1 752 796 A2 | 2/2007 |
| EP | 1 752 816 A1 | 2/2007 |
| WO | WO-91/04283 A1 | 4/1991 |
| WO | WO-93/09154 A1 | 5/1993 |
| WO | WO-01/57047 A1 | 8/2001 |
| WO | WO-01/57048 A1 | 8/2001 |
| WO | WO-2004/060099 A2 | 7/2004 |
| WO | WO-2004/060099 A3 | 7/2004 |
| WO | WO 2004/063795 A1 | 7/2004 |
| WO | WO-2004/081105 A2 | 9/2004 |
| WO | WO-2004/081105 A3 | 9/2004 |
| WO | WO-2006/026474 A2 | 3/2006 |
| WO | WO-2006/026474 A3 | 3/2006 |
| WO | WO-2007/061919 A2 | 5/2007 |
| WO | WO-2007/061919 A3 | 5/2007 |

OTHER PUBLICATIONS

Srinivasulu et al. J. Appl. Polm. Sci. 1993, 47, 1463-1468. John Wiley & Sons, Inc.*

Tamikado et al. J. Polymer Sci. 1959, 36, 529-532. John Wiley & Sons, Inc.*

Brar et al. Journal of Molecular Structure 2002, 616, 37-47. Elsevier Science B. V.*

European Search Report for European Application No. 07002505.1 (Jun. 19, 2007).

European Search Report for European Application No. 07252444.0 (Oct. 10, 2007).

European Search Report for European Application No. 07252445.7 (Oct. 10, 2007).

European Search Report for European Application No. 07252446.5 (Oct. 10, 2007).

Willis et al., "A Novel Phosphorylcholine-Coated Contact Lens for Extended Wear Use", *Biomaterials*, 22:3761-3772 (2001).

Office Action from the U.S. Patent and Trademark Office dated Jun. 9, 2008 received in corresponding U.S. Appl. No. 11/761,272 (17 pages).

Office Action from the U.S. Patent and Trademark Office dated Aug. 6, 2008 received in corresponding U.S. Appl. No. 11/761,324 (12 pages).

Office Action from the U.S. Patent and Trademark Office dated Jan. 9, 2009 received in corresponding U.S. Appl. No. 11/761,324 (6 pages).

Office Action from the U.S. Patent and Trademark Office dated Mar. 5, 2009 received in corresponding U.S. Appl. No. 11/761,324 (6 pages).

Office Action from the U.S. Patent and Trademark Office dated Mar. 25, 2009 received in corresponding U.S. Appl. No. 11/761,324 (10 pages).

Office Action from the U.S. Patent and Trademark Office dated Dec. 23, 2008 received in corresponding U.S. Appl. No. 11/761,272 (25 pages).

Office Action from the U.S. Patent and Trademark Office dated Dec. 23, 2008 received in corresponding U.S. Appl. No. 11/213,437 (25 pages).

* cited by examiner

WETTABLE SILICONE HYDROGEL CONTACT LENSES AND RELATED COMPOSITIONS AND METHODS

CROSS-REFERENCE TO RELATED APPLICATIONS

This application claims the benefit of U.S. Application No. 60/804,911, filed Jun. 15, 2006; U.S. Application No. 60/887,513, filed Jan. 31, 2007; and U.S. Application No. 60/894,609, filed Mar. 13, 2007, the entire contents of which are hereby incorporated by reference.

FIELD OF THE INVENTION

The present invention is directed to silicone hydrogel ophthalmic devices and related compositions and methods. More particularly, the present invention relates to wettable molded silicone hydrogel contact lenses, and related compositions and methods.

BACKGROUND

Silicone hydrogel contact lenses have become popular due to the ability of contact lens wearers to wear such lenses on their eyes for longer times compared to non-silicone hydrogel contact lenses. For example, depending on the particular lens, silicone hydrogel contact lenses can be worn or prescribed for daily wear, weekly wear, biweekly wear, or monthly wear. Benefits to lens wearers associated with silicone hydrogel contact lenses can be attributed, at least in part, to the combination of hydrophilic components and the hydrophobic properties of silicon-containing polymeric materials of the contact lenses.

Non-silicone hydrogel contact lenses, such as 2-hydroxyethylmethacrylate (HEMA) based hydrogel contact lenses, are often produced in non-polar resin contact lens molds, for example, contact lens molds produced from polyolefin-based resins. In other words, lens precursor compositions for non-silicone hydrogel contact lenses are polymerized in non-polar resin contact lens molds to produce HEMA-based polymeric or polymerized lens products. Due to the hydrophilic nature of the polymeric components of HEMA-based contact lenses, the HEMA-based lenses are ophthalmically compatible and have ophthalmically acceptable surface wettabilities, even in spite of being produced using non-polar resin molds.

However, existing silicone hydrogel contact lenses obtained from non-polar resin molds have hydrophobic lens surfaces. In other words, the surfaces of such silicone hydrogel contact lenses have low wettability and therefore are not ophthalmically compatible or ophthalmically acceptable. For example, such silicone hydrogel contact lenses may be associated with increased lipid deposition, protein deposition, and irritation to a lens wearer. Surface treatments or surface modifications have been used on the surfaces of such silicone hydrogel contact lenses or lens products to increase the hydrophilicity and wettability of the lens surfaces. Examples of surface treatment of silicone hydrogel lenses include coating a surface of the lens, adsorbing chemical species onto the surface of the lens, altering the chemical nature or electrostatic charge of chemical groups on the surface of the lens. Surface treatments have been described which include using a plasma gas to coat the surface of a polymerized lens, or using a plasma gas on a contact lens mold surface to treat the mold prior to forming a polymerized lens. Surface treatment of contact lenses requires more machinery and time to produce contact lenses compared to manufacturing methods that do not use surface treatments or modifications. In addition, surface treated silicone hydrogel contact lenses can exhibit a decreased surface wettability as the lens is being worn and/or handled by the lens wearer. For example, increased handling of a surface treated lens can result in the hydrophilic surface being degraded or worn away.

An alternative approach to increasing the wettability and ophthalmic compatibility of silicone hydrogel lenses is to polymerize a silicone hydrogel contact lens precursor composition in the presence of a different composition that comprises a polymeric wetting agent, such as polyvinylpyrrolidone (PVP). These types of lenses may be understood to be silicone hydrogel contact lenses with polymeric internal wetting agents. In addition, it may further be understood that these lenses comprise an interpenetrating polymer network (IPN) that includes a high molecular weight polymer, such as PVP. As understood by persons of ordinary skill in the art, an IPN refers to a combination of two or more different polymers, in network form, of which at least one is synthesized and/or cross-linked in the presence of the other without any covalent bonds between them. An IPN can be composed of two kinds of chains forming two separate networks, but in juxtaposition or interpenetrating. Examples of IPNs include sequential IPNs, simultaneous IPNs, semi-IPNs and homo-IPNs. Although silicone hydrogel contact lenses that include an IPN of a polymeric wetting agent avoid the problems associated with surface treatment, these lenses may not retain their ophthalmic compatibility, including surface wettability, for prolonged periods of time. For example, the internal wetting agents, since they are not covalently bound to the other polymerized lens forming components, may leach out from the lens while being worn by a lens wearer and thereby lead over time to a decreased surface wettability and increased discomfort to the lens wearer.

As an alternative to surface treatment or use of a polymeric wetting agent IPN, as described above, it has been found that silicone hydrogel contact lenses with ophthalmically acceptable surface wettabilities can be produced using polar resin molds instead of non-polar resin molds. For example, silicone hydrogel contact lenses formed in ethylene-vinyl alcohol or polyvinyl alcohol based molds have desirable surface wettabilities. One example of a useful polar resin used in the manufacture of contact lens molds for non-surface treated silicone hydrogel contact lenses free of an IPN of a polymeric wetting agent is a resin of ethylene-vinyl alcohol copolymers such as the ethylene-vinyl alcohol copolymer resin sold under the trade name SOARLITE™ by Nippon Gohsei, Ltd. In addition to its polarity, SOARLITE™ is said to have the following characteristics: extremely high mechanical strength, antistatic properties, low contractility when used in molding processes, excellent oil and solvent resistance, small coefficient of thermal expansion, and good abrasion resistance.

Although SOARLITE™ based molds provide a desirable alternative for producing ophthalmically compatible silicone hydrogel contact lenses without the use of a surface treatment or a polymeric wetting agent IPN, SOARLITE™ molds are less deformable or flexible than non-polar resin molds, such as polypropylene molds, and are relatively more difficult to work with compared to non-polar resin molds.

Examples of documents which may relate to the production of contact lenses, such a silicone hydrogel contact lenses, include U.S. Pat. Nos. 4,121,896; 4,495,313; 4,565,348; 4,640,489; 4,889,664; 4,985,186; 5,039,459; 5,080,839; 5,094,609; 5,260,000; 5,607,518; 5,760,100; 5,850,107; 5,935,492; 6,099,852; 6,367,929; 6,822,016; 6,867,245;

6,869,549; 6,939,487; and U.S. Patent Publication Nos. 20030125498; 20050154080; and 20050191335.

In view of the above, there continues to be a need for ophthalmically compatible silicone hydrogel contact lenses that can be more easily produced compared to silicone hydrogel contact lenses obtained from SOARLITE™ contact lens molds, and that do not require surface treatment or use of a polymeric wetting agent IPN, including a PVP IPN, to achieve ophthalmic compatibility. An existing problem relates to obtaining an ophthalmically compatible silicone hydrogel contact lens, such as a silicone hydrogel contact lens that has an ophthalmically compatible surface wettability, from non-polar resin or polyolefin-based contact lens mold members without using a surface treatment or a polymeric wetting agent IPN.

SUMMARY

The present contact lenses, lens products, compositions, and methods attempt to address needs and problems associated with existing silicone hydrogel contact lenses. It has been surprisingly discovered that ophthalmically compatible silicone hydrogel contact lenses can be obtained by providing relatively large amounts of removable materials in a pre-extracted polymerized silicone hydrogel contact lens product that is extracted and hydrated to result in a silicone hydrogel contact lens. A pre-extracted polymerized silicone hydrogel lens product having a removable component, that is one or more removable materials, including extractable materials and the like, that is at least 10% (w/w) of the weight of the pre-extracted polymerized silicone hydrogel lens product can be extracted and hydrated to form a silicone hydrogel contact lens having an ophthalmically acceptable surface wettability, as described herein. The present lenses have an oxygen permeability, a surface wettability, a modulus, a water content, ionoflux, and design which permit the present lenses to be comfortably worn on a patient's eye for extended periods of time, such as for at least a day, at least a week, at least two weeks, or about a month without requiring removal of the lens from the eye.

The present silicone hydrogel contact lenses comprise lens bodies that have surfaces, such as an anterior surface and a posterior surface, with ophthalmically acceptable wettabilities. The surface wettability of the present silicone hydrogel contact lenses is related to the amount of the removable component present in the pre-extracted polymerized silicone hydrogel contact lens products. The lens bodies of the present silicone hydrogel contact lenses do not require a surface treatment or an IPN of a polymeric wetting agent to obtain an ophthalmically acceptable surface wettability. The present silicone hydrogel contact lenses do not require the use of polar resin molds, such as SOARLITE™ based molds to obtain an ophthalmically acceptable surface wettability. In addition, the present lenses do not require further machining after a curing procedure or delensing procedure. However, it can be appreciated that certain embodiments of the present invention may optionally include a surface treatment, a polymeric wetting agent IPN, and/or the use of a polar resin mold or post-curing machining or post-delensing machining, if desired.

One aspect of the present invention relates to silicone hydrogel contact lenses. The present silicone hydrogel contact lenses include lens bodies having ophthalmically acceptable surface wettabilities. In certain embodiments, the lens body can be understood to include a silicone hydrogel material, and understood to have a dry weight no greater than 90% of the dry weight of the lens body prior to extraction. The dry weight can be understood to be the weight of a lens body that does not contain noticeable amounts of water, or any amount water. In certain other embodiments, the lens body can be understood to be a lens body obtained from a pre-extracted polymerized silicone hydrogel contact lens product that has a removable component in an amount of at least 10% (w/w). In other words, the pre-extracted polymerized silicone hydrogel contact lens product has a removable component content of at least 10% (w/w). In additional embodiments, the lens body can be understood to be a lens body produced by extracting an extractable component from a pre-extracted polymerized silicone hydrogel contact lens product to produce an extracted polymerized silicone hydrogel contact lens product, and hydrating the extracted polymerized silicone hydrogel contact lens product to produce a silicone hydrogel contact lens having an ophthalmically acceptable surface wettability. The pre-extracted polymerized silicone hydrogel contact lens product has an extractable component content t of at least 10% (w/w) of the pre-extracted lens body.

In certain embodiments, the pre-extracted polymerized silicone hydrogel contact lens product having a removable component content of at least 10% (w/w) is substantially or entirely free of a non-reactive additive, such as a diluent and the like. For example, such pre-extracted lens products can be obtained from polymerizable compositions that are free of diluents, compatibilizers, or other non-reactive additives. As used herein, polymerizable compositions that are free of diluents, compatibilizers, or other non-reactive additives can be referred to as "bulk formulations" or "bulk compositions". The bulk formulations do not include non-reactive additives and are able to form the present pre-extracted polymerized silicone hydrogel contact lens products having an extractable component content of at least 10% (w/w) of the pre-extracted lens body.

Additional formulations or polymerizable compositions can include one or more additives and thereby result in an even greater amount of an extractable component present in the pre-extracted polymerized lens product compared to lens products obtained from bulk formulations. For example, when a pre-extracted polymerized silicone hydrogel contact lens product obtained from a bulk formulation has an extractable component content of 15%, a second pre-extracted polymerized silicone hydrogel contact lens product obtained from the same formulation with the addition of a diluent in an amount of 15% (w/w) may be understood to have an extractable component content of 30% (w/w). After an extraction and hydration procedure, the dry weight of the silicone hydrogel contact lens obtained from the pre-extracted lens product would be 70% of the dry weight of the pre-extracted lens product.

Another aspect of the present invention relates to pre-extracted polymerized silicone hydrogel contact lens products. Such lens products can be understood to be products that are produced from a curing procedure or a polymerization procedure, for example in a cavity of a mold, and have not undergone an extraction procedure or have not come into contact with an extraction composition. In certain embodiments, the contact lens product includes a pre-extracted body member that has a dry weight at least 10% greater than the dry weight of the body member after subjecting the body member to an extraction procedure to form an extracted polymerized silicone hydrogel contact lens product. For example, the pre-extracted body member may comprise an extractable component content of at least 10% (w/w) of the pre-extracted body member. In further embodiments, the extractable component content is greater than 15% (w/w) of the pre-extracted body member and is less than 80% (w/w) of the pre-extracted body member. In certain embodiments, the extractable component content is greater than 20% (w/w) of the pre-extracted body member and is less than 75% (w/w) of the pre-extracted body member. The pre-extracted body member of the present pre-extracted polymerized silicone hydrogel contact lens products may include one or more removable additives, such as additives that can be removed during an extraction procedure. For example, the body member may include one or more compatibilizers, demolding aids, delensing aids, wettability enhancers, and ionoflux reducers. The removable additives may be understood to be non-reactive additives or may be understood to be reactive additives that can be removed from a polymerized silicone hydrogel contact lens product during an extraction procedure.

Another aspect of the present invention relates to polymerizable silicone hydrogel contact lens precursor compositions. The present polymerizable silicone hydrogel contact lens precursor compositions comprise lens forming components, such as monomeric materials, and one or more optional additives, as described herein, which form polymerized silicone hydrogel contact lens products having a substantial amount of a removable component. In certain embodiments, a polymerizable silicone hydrogel contact lens precursor composition includes a polymerizable silicon-containing component and a polymerizable non-silicon-containing component. The two components are combined as a polymerizable silicone hydrogel contact lens precursor composition. A portion of the precursor composition is removable from a polymerized silicone hydrogel contact lens product produced from the precursor composition. The portion is present in an amount of at least 10% (w/w) of the pre-extracted polymerized silicone hydrogel contact lens product. In certain embodiments, the precursor composition includes a first monomer having a first reactivity ratio, and a second monomer having a second reactivity ratio that is less than the first reactivity ratio. As understood by persons or ordinary skill in the art, a reactivity ratio can be defined as the ratio of the reaction rate constant of each propagating species adding its own monomer to the rate constant for its addition of other monomer. Such compositions may also include a cross-linking agent having a reactivity ratio similar to the first reactivity ratio. In certain embodiments, the lens precursor compositions may include one or more removable additives. For example, embodiments of the lens precursor compositions may include one or more compatibilizers, demolding aids, delensing aids, wettability enhancers, and ionoflux reducers which are removable.

Yet another aspect of the present invention relates to methods of making ophthalmically compatible silicone hydrogel contact lenses. In certain embodiments, the present methods comprise forming a lens body that includes a silicone hydrogel material and has an ophthalmically acceptable surface wettability and a dry weight no greater than 90% of the dry weight of the lens body prior to extraction. Methods may also include extracting an extractable component from a pre-extracted polymerized silicone hydrogel contact lens product, wherein the extractable component content is at least 10% (w/w) of the pre-extracted polymerized silicone hydrogel contact lens product. Methods may also include forming a polymerizable silicone hydrogel contact lens precursor composition useful in the production of the present pre-extracted silicone hydrogel contact lens products and the present silicone hydrogel contact lenses.

Additional embodiments of the present lenses, lens products, compositions and methods will be apparent from the following description, drawings, examples, and claims. As can be appreciated from the foregoing and following description, each and every feature described herein, and each and every combination of two or more of such features, is included within the scope of the present invention provided that the features included in such a combination are not mutually inconsistent. In addition, any feature or combination of features may be specifically excluded from any embodiment of the present invention. Additional aspects and advantages of the present invention are set forth in the following description and claims, particularly when considered in conjunction with the accompanying examples and drawings.

DETAILED DESCRIPTION

Figure 1:
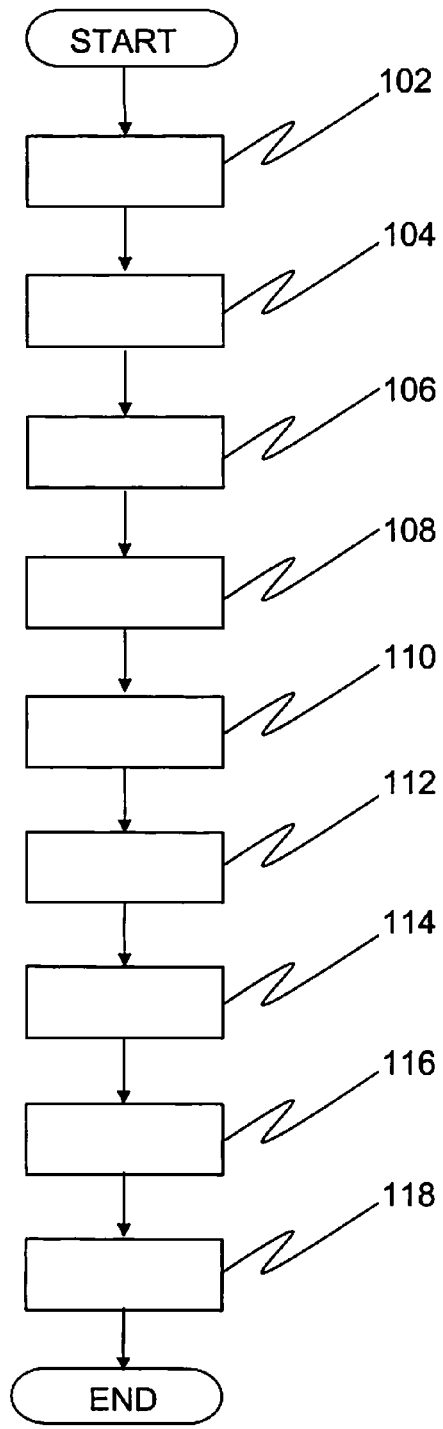
FIG. 1 is a flow chart illustrating steps of a method for producing a silicone hydrogel contact lens.

FIG. 1 illustrates a method for producing a silicone hydrogel contact lens. The illustrated method is a method of cast molding a silicone hydrogel contact lens. Cast molded contact lenses can be produced in a form suitable for placement on an eye of a person. For example, cast molded contact lenses do not require any further machining to change the lens to make the lens suitable for use on an eye. The present silicone hydrogel contact lenses produced using a cast molding procedure, such as the procedure illustrated in FIG. 1, can be understood to be cast molded silicone hydrogel contact lenses. In addition, the present lenses can be understood to be fully molded silicone hydrogel contact lenses if no further machining is used to change the lens design.

As used herein, the term "hydrogel" refers to a network or matrix of polymer chains, some or all of which may be water-soluble, and which may contain high percentages of water. Hydrogels refer to polymeric materials, including contact lenses, that are water swellable or water swelled. Thus, a hydrogel may be unhydrated and be water swellable, or a hydrogel may be partially hydrated and swollen with water, or a hydrogel may be fully hydrated and swollen with water. The term "silicone hydrogel" or "silicone hydrogel material" refers to a hydrogel that includes a silicon component or a silicone component. For example, a silicone hydrogel includes one or more hydrophilic silicon-containing polymers. A silicone hydrogel contact lens is a contact lens, including a vision correcting contact lens, that comprises a silicone hydrogel material.

A silicone-containing component is a component that contains at least one [—Si—O—Si] group, in a monomer, macromer or prepolymer. The Si and attached O may be present in the silicone-containing component in an amount greater than 20 weight percent, for example greater than 30 weight percent of the total molecular weight of the silicone-containing component. Useful silicone-containing components comprise polymerizable functional groups such as acrylate, methacrylate, acrylamide, methacrylamide, N-vinyl lactam, N-vinylamide, and styryl functional groups. Examples of some silicone-containing components which are useful in the present lenses may be found in U.S. Pat. Nos. 3,808,178; 4,120,570; 4,136,250; 4,153,641; 4,740,533; 5,034,461 and 5,070,215, and EP080539.

Further examples of suitable silicone-containing monomers are polysiloxanylalkyl(meth)acrylic monomers including, without limitation, methacryloxypropyl tris(trimethylsiloxy)silane, pentamethyldisiloxanyl methylmethacrylate, and methyldi(trimethylsiloxy)methacryloxymethyl silane.

One useful class of silicone-containing components is a poly(organosiloxane) prepolymer such as α, ω-bismethacryloxy-propyl polydimethylsiloxane. Another example is mPDMS (monomethacryloxypropyl terminated mono-n-butyl terminated polydimethylsiloxane). Another useful class of silicone containing components includes silicone-containing vinyl carbonate or vinyl carbamate monomers including, without limitation, 1,3-bis[4-(vinyloxycarbonyloxy)but-1-yl]tetramethylisiloxane 3-(vinyloxycarbonylthio)propyl-[tris(trimethylsiloxysilane]; 3-[tris(trimethylsiloxy)silyl]propyl allyl carbamate; 3-[tris(trimethylsiloxy)wilyl]propyl vinyl carbamate; trimethylsilylethyl vinyl carbonate; and trimethylsilylmethyl vinyl carbonate. An example of suitable materials include agents represented by the following formula:

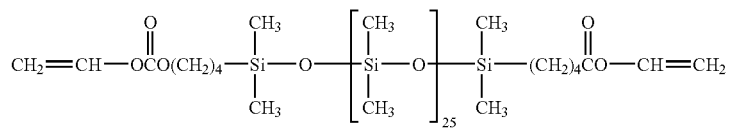

Another example of suitable materials include agents represented by the following formula:

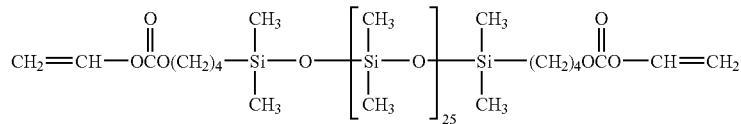

In addition to the silicon-containing component, the present lenses, lens products, and compositions may include one or more hydrophilic components. Hydrophilic components include those which are capable of providing at least about 20%, for example, at least about 25% water content to the resulting lens when combined with the remaining reactive components. Suitable hydrophilic components may be present in amounts between about 10 to about 60 weight % based upon the weight of all reactive components. About 15 to about 50 weight %, for example, between about 20 to about 40 weight %. Hydrophilic monomers that may be used to make the polymers for the present lenses have at least one polymerizable double bond and at least one hydrophilic functional group. Examples of polymerizable double bonds include acrylic, methacrylic, acrylamido, methacrylamido, fumaric, maleic, styryl, isopropenylphenyl, O-vinylcarbonate, O-vinylcarbamate, allylic, O-vinylacetyl and N-vinyllactam and N-vinylamido double bonds. Such hydrophilic monomers may themselves be used as crosslinking agents. "Acrylic-type" or "acrylic-containing" monomers are those monomers containing the acrylic group (CR'H=CRCOX) wherein R is H or $CH_3$, R' is H, alkyl or carbonyl, and X is O or N, which are also known to polymerize readily, such as N,N-dimethylacrylamide (DMA), 2-hydroxyethyl acrylate, glycerol methacrylate, 2-hydroxyethyl methacrylamide, polyethyleneglycol monomethacrylate, methacrylic acid, acrylic acid and mixtures thereof.

Hydrophilic vinyl-containing monomers which may be incorporated into the materials of the present lenses may include monomers such as N-vinyl lactams (e.g. N-vinyl pyrrolidone (NVP)), N-vinyl-N-methyl acetamide, N-vinyl-N-ethyl acetamide, N-vinyl-N-ethyl formamide, N-vinyl formamide, N-2-hydroxyethyl vinyl carbamate, N-carboxy-β-alanine N-vinyl ester. In one embodiment, the hydrophilic vinyl-containing monomer is NVP.

Other hydrophilic monomers that can be employed in the present lenses include polyoxyethylene polyols having one or more of the terminal hydroxyl groups replaced with a functional group containing a polymerizable double bond. Examples include polyethylene glycol with one or more of the terminal hydroxyl groups replaced with a functional group containing a polymerizable double bond. Examples include polyethylene glycol reacted with one or more molar equivalents of an end-capping group such as isocyanatoethyl methacrylate ("IEM"), methacrylic anhydride, methacryloyl chloride, vinylbenzoyl chloride, or the like, to produce a polyethylene polyol having one or more terminal polymerizable olefinic groups bonded to the polyethylene polyol through linking moieties such as carbamate or ester groups.

Additional examples are the hydrophilic vinyl carbonate or vinyl carbamate monomers disclosed in U.S. Pat. No. 5,070,215, and the hydrophilic oxazolone monomers disclosed in U.S. Pat. No. 4,190,277. Other suitable hydrophilic monomers will be apparent to one skilled in the art. More preferred hydrophilic monomers which may be incorporated into the polymer of the present invention include hydrophilic monomers such as N,N-dimethyl acrylamide (DMA), 2-hydroxyethyl acrylate, glycerol methacrylate, 2-hydroxyethyl methacrylamide, N-vinylpyrrolidone (NVP), polyethyleneglycol monomethacrylate, and polyethyleneglycol dimethacrylate. In certain embodiments, hydrophilic monomers including DMA, NVP and mixtures thereof are employed.

Additional examples of materials used to make silicone hydrogel contact lenses include those materials disclosed in U.S. Pat. No. 6,867,245.

Figure 2:
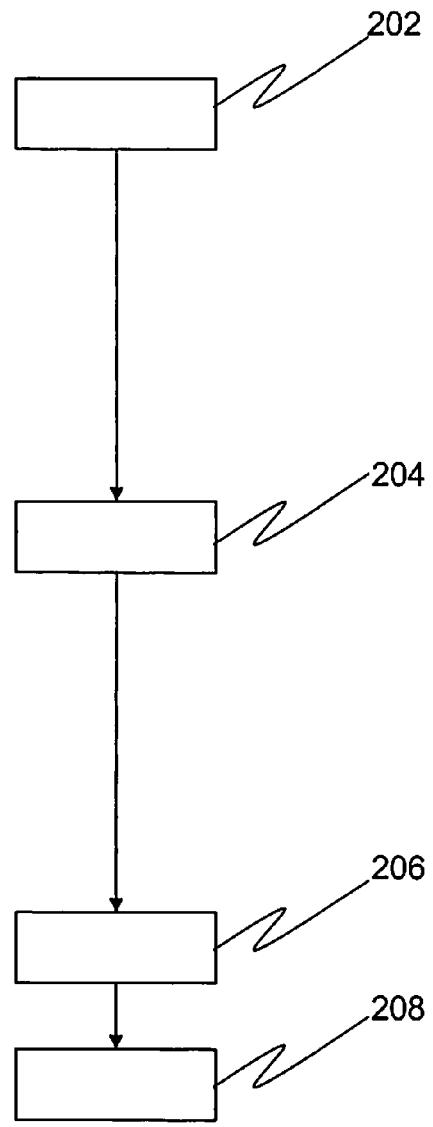
FIG. 2 is a flow chart illustrating the present compositions, lens products, and contact lenses.

The illustrated method includes a step 102 of placing a lens precursor composition on or in a contact lens mold member. In reference to the present application, the lens precursor composition can be understood to be a polymerizable silicone hydrogel lens precursor composition 202, as shown in FIG. 2. The polymerizable silicone hydrogel lens precursor composition may be understood to be a pre-polymerized or pre-cured composition suitable for polymerization. As used herein, the present polymerizable composition may also be referred to as a monomer mix or a reaction mixture. Preferably, the polymerizable composition or lens precursor composition is not polymerized before curing or polymerization of the composition. However, polymerizable compositions or lens precursor compositions may be partially polymerized before undergoing a curing process. The present lens precursor compositions can be provided in containers, dispensing devices, or contact lens molds prior to a curing or polymerization procedure, as described herein. Referring back to FIG. 1, the lens precursor composition is placed on a lens forming surface of a female contact lens mold member. The female contact lens mold member may be understood to be a first contact lens mold member or an anterior contact lens mold member. For example, the female contact lens mold member has a lens forming surface that defines the anterior or front surface of a contact lens produced from the contact lens mold.

The first contact lens mold member is placed in contact with a second contact lens mold member to form a contact lens mold having a contact lens shaped cavity. Therefore, the method illustrated in FIG. 1 includes a step 104 of closing a contact lens mold by placing two contact lens mold members in contact with each other to form a contact lens shaped cavity. The polymerizable silicone hydrogel lens precursor composition 202 is located in the contact lens shaped cavity. The second contact lens mold member may be understood to be a male contact lens mold member or a posterior contact lens mold member. For example, the second contact lens mold member includes a lens forming surface that defines the posterior surface of a contact lens produced in the contact lens mold.

At step 106, the method includes curing the polymerizable silicone hydrogel lens precursor composition to form a pre-extracted polymerized silicone hydrogel contact lens product 204, as shown in FIG. 2. During curing, the lens forming components of the polymerizable silicone hydrogel lens precursor composition polymerize to form a polymerized lens product. Thus, the curing may also be understood to be a polymerizing step. The curing 106 can include exposing the polymerizable lens precursor composition to radiation effective in polymerizing the components of the lens precursor composition. For example, the curing 106 can include exposing the polymerizable lens precursor composition to polymerizing amounts of heat or ultraviolet (UV) light, among other things. The curing can also include curing the compositions in an oxygen-free environment. For example, the curing can occur in the presence of nitrogen or other inert gases.

The pre-extracted polymerized silicone hydrogel contact lens product 204 refers to a polymerized product prior to undergoing an extraction procedure that removes substantially all of an extractable component from the polymerized product. Pre-extracted polymerized silicone hydrogel contact lens products can be provided on or in contact lens molds, extraction trays, or other devices prior to being contacted by an extraction composition. For example, a pre-extracted polymerized silicone hydrogel contact lens product may be provided in a lens shaped cavity of a contact lens mold after a curing procedure, may be provided on or in one contact lens mold member after demolding of the contact lens mold, or may be provided on or in an extraction tray or other device after a delensing procedure and prior to an extraction procedure. The pre-extracted polymerized silicone hydrogel contact lens product includes a lens forming component, such as a silicon-containing polymeric network or matrix in the shape of a lens, and a removable component that can be removed from the lens forming component. The removable component can be understood to include unreacted monomers, oligomers, partially reacted monomers, or other agents which have not become covalently attached or otherwise immobilized relative to the lens-forming component. The removable component can also be understood to include one or more additives, including organic additives, including diluents, that can be extracted from the polymerized lens product during an extraction procedure, as discussed herein. Thus, materials of the removable component can include linear uncross-linked, cross-linked, or branched polymers of extractable materials that are not cross-linked to or otherwise immobilized relative to the polymer backbone, network, or matrix of the lens body.

After curing the polymerizable lens precursor compositions, the method includes a step 108 of demolding the contact lens mold. Demolding refers to the process of separating two mold members, such as male and female mold members, of a mold containing a pre-extracted polymerized contact lens product or polymerized device. The pre-extracted polymerized silicone hydrogel contact lens product is located on one of the demolded mold members. For example, the polymerized silicone hydrogel contact lens product may be located on the male mold member or the female mold member.

The pre-extracted polymerized silicone hydrogel contact lens product 204 is then separated from the contact lens mold member on which it is located during delensing step 110, as shown in FIG. 1. The pre-extracted polymerized contact lens product can be delensed from the male mold member or the female mold member, depending on which mold member the polymerized contact lens product remains adhered during the demolding of the contact lens mold.

After delensing the pre-extracted silicone hydrogel contact lens products, the method includes a step 112 of extracting extractable materials from the pre-extracted silicone hydrogel contact lens product. The extraction step 112 results in an extracted silicone hydrogel contact lens product 206, as shown in FIG. 2. Extraction step 112 refers to a procedure in which a pre-extracted polymerized silicone hydrogel contact lens product is contacted with one or more extraction compositions. For example, a polymerized silicone hydrogel contact lens product or a batch of polymerized silicone hydrogel contact lens products can be contacted with one or more volumes of a liquid extraction medium or liquid extraction media. The extraction media can include solvents. For example, the extraction media can include ethanol, methanol, propanol, and other alcohols. Extraction media can also include mixtures of alcohols and water, such as a mixture of 50% ethanol and 50% deionized water, or a mixture of 70% ethanol and 30% deionized water, or a mixture of 90% ethanol and 10% deionized water. Alternatively, the extraction media can be substantially or entirely alcohol free, and may include one or more agents facilitating removal of hydrophobic unreacted components from a polymerized silicone hydrogel lens product. For example, the extraction media can comprise, consist essentially of, or consist entirely of water, buffer solutions, and the like. The extraction step 112 can be practiced at different temperatures. For example, the extraction can occur at room temperature (e.g., about 20 degrees C.), or it can occur at an elevated temperature (e.g., from about 25 degrees C. to about 100 degrees C.). In addition, in certain embodiments, the extraction step 112 can include a step of contacting lens products with a mixture of alcohol and water, which can be the last step of a multi-step extraction procedure.

After extracting the pre-extracted polymerized silicone hydrogel contact lens products, the method includes a step 114 of hydrating the extracted polymerized silicone hydrogel contact lens products. The hydrating step 114 can include contacting an extracted polymerized silicone hydrogel contact lens product or one or more batches of such products with water or an aqueous solution to form a hydrated silicone hydrogel contact lens 208, as shown in FIG. 2. For example, the extracted polymerized silicone hydrogel contact lens product can be hydrated by being placed in two or more separate volumes of water, including deionized water. In certain methods, the hydrating step 114 can be combined with the extraction step 112 such that both steps are performed at a single station in a contact lens production line. In certain methods, the hydration step 114 can be performed in a container at room temperature or at an elevated temperature, and if desired, at an elevated pressure. For example, hydration can occur in water at a temperature of about 120 degrees C. (e.g., 121 degrees C.) and at a pressure of 103 kPa (15 psi).

In view of the above, it can be understood that the pre-extracted polymerized silicone hydrogel contact lens products and the extracted polymerized silicone hydrogel contact lens products are water swellable products or elements, and that the hydrated silicone hydrogel contact lens is a product or element swollen with water. As used herein, a silicone hydrogel contact lens refers to a silicone hydrogel element that has undergone a hydration step. Thus, a silicone hydrogel contact lens can be understood to be a fully hydrated silicone hydrogel contact lens, a partially hydrated silicone hydrogel contact lens, or a dehydrated silicone hydrogel contact lens. A dehydrated silicone hydrogel contact lens refers to a contact lens that has undergone a hydration procedure and has subsequently been dehydrated to remove water from the lens.

After hydrating the extracted silicone hydrogel contact lens product to produce a silicone hydrogel contact lens, the method includes a step 116 of packaging the silicone hydrogel contact lens 208. For example, the silicone hydrogel contact lens 208 can be placed in a blister pack or other suitable container that includes a volume of a liquid, such as a saline solution, including buffered saline solutions. Examples of liquids suitable for the present lenses include phosphate buffered saline and borate buffered saline. The blister pack or container can be sealed, and subsequently sterilized, as shown at step 118. For example, the packaged silicone hydrogel contact lens can be exposed to sterilizing amounts of radiation, including heat, such as by autoclaving, gamma radiation, e-beam radiation, or ultraviolet radiation.

The present ophthalmically compatible silicone hydrogel contact lenses can be obtained by providing relatively large amounts of removable materials in a pre-extracted polymerized silicone hydrogel contact lens product. A pre-extracted polymerized silicone hydrogel lens product having a removable component, that is one or more removable materials, including extractable materials and the like, that is at least 10% (w/w) of the weight of the pre-extracted polymerized silicone hydrogel lens product can be extracted and hydrated to form a silicone hydrogel contact lens having an ophthalmically acceptable surface wettability. The present lenses have an oxygen permeability, a surface wettability, a modulus, a water content, ionoflux, a design, and combinations thereof which permit the present lenses to be comfortably worn on a patient's eye for extended periods of time, such as for at least a day, at least a week, at least two weeks, or about a month without requiring removal of the lens from the eye.

As used herein, an "ophthalmically compatible silicone hydrogel contact lens" can be understood to refer to a silicone hydrogel contact lens that can be worn on a person's eye without the person experiencing or reporting substantial discomfort, including ocular irritation and the like. Ophthalmically compatible silicone hydrogel contact lenses have ophthalmically acceptable surface wettabilities, and typically do not cause or are not associated with significant corneal swelling, corneal dehydration ("dry eye"), superior-epithelial arcuate lesions ("SEALs"), or other significant discomfort. A silicone hydrogel contact lens having an ophthalmically acceptable surface wettability can be understood to refer to a silicone hydrogel contact lens that does not adversely affect the tear film of a lens wearer's eye to a degree that results in the lens wearer experiencing or reporting discomfort associated with placing or wearing the silicone hydrogel contact lens on an eye. Ophthalmically compatible silicone hydrogel contact lenses meet clinical acceptability requirements for daily wear or extended wear contact lenses.

The present silicone hydrogel contact lenses comprise lens bodies that have surfaces, such as an anterior surface and a posterior surface, with ophthalmically acceptable wettabilities. Wettability refers to the hydrophilicity of one or more surfaces of a contact lens. As used herein, a surface of a lens can be considered wettable, or have an ophthalmically acceptable wettability, if the lens receives a score of 3 or above in a wettability assay conducted as follows. A contact lens is dipped into distilled water, removed from the water, and the length of time that it takes for the water film to recede from the lens surface is determined (e.g., water break up time (water BUT)). The assay grades lenses on a linear scale of 1-10, where a score of 10 refers to a lens in which a drop takes 20 seconds or more to recede from the lens. A silicone hydrogel contact lens having a water BUT of more than 5 seconds, such as at least 10 seconds or more desirably at least about 15 seconds, can be a silicone hydrogel contact lens having an ophthalmically acceptable surface wettability. Wettability can also be determined by measuring a contact angle on one or both lens surfaces. The contact angle can be a dynamic or static contact angle. Lower contact angles generally refer to increased wettability of a contact lens surface. For example, a wettable surface of a silicone hydrogel contact lens can have a contact angle less than about 120 degrees. However, in certain embodiments of the present lenses, the lenses have a contact angle no greater than 90 degrees, and in further embodiments, the present silicone hydrogel contact lenses have advancing contact angles less than about 80 degrees.

It has been discovered that by controlling the amount or type of reactable components or combination of reactable and non-reactable components in the present polymerizable compositions, such as the present polymerizable silicone hydrogel contact lens precursor compositions, and the present polymerized compositions, such as pre-extracted polymerized silicone hydrogel contact lens products, it is possible to obtain silicone hydrogel contact lenses with ophthalmically acceptable surface wettabilities. The present silicone hydrogel contact lenses with ophthalmically acceptable surface wettabilities do not require a surface treatment or a polymeric wetting agent IPN to provide the surface wettability, and do not require production in a polar resin contact lens mold to provide the surface wettability. For example, the present silicone hydrogel contact lenses with ophthalmically acceptable surface wettabilities can be obtained from non-polar resin contact lens molds or hydrophobic resin contact lens molds without a surface treatment or a polymeric wetting agent IPN.

As used herein, a "non-polar resin contact lens mold" or "hydrophobic resin contact lens mold" refers to a contact lens mold that is formed or produced from a non-polar or hydrophobic resin. Thus, a non-polar resin based contact lens mold can comprise a non-polar or hydrophobic resin. For example, such contact lens molds can comprise one or more polyolefins, or can be formed from a polyolefin resin material. Examples of non-polar resin contact lens molds used in the context of the present application include polyethylene contact lens molds, polypropylene contact lens molds, and polystyrene contact lens molds. Non-polar resin based contact lens molds typically have hydrophobic surfaces. For example, a non-polar resin mold or a hydrophobic resin mold may have a static contact angle of about 90 degrees or more, as determined using the captive bubble method. With such contact angles, conventional silicone hydrogel contact lenses produced in such molds have clinically unacceptable surface wettabilities.

By providing relatively slow reacting monomers in the polymerizable compositions, such as by providing two or more monomer types with different reactivity ratios in the same polymerizable composition, it is possible to control the amount of the removable component in the pre-extracted polymerized silicone hydrogel contact lens product. Slow reacting monomers, such as monomers in the polymerizable composition which do not fully crosslink into the network during a curing procedure, can provide a relatively large amount of a removable component in the polymerized silicone hydrogel contact lens product. The non-fully crosslinked agents, such as unreacted or only partially reacted monomers, oligomers, linear polymers, slightly crosslinked components, and the like, are extracted from the polymerized component of the polymerized silicone hydrogel contact lens products.

In certain of the present polymerizable compositions and polymerized silicone hydrogel contact lens products, a removable additive is present. For example, some of the present polymerizable compositions and polymerized silicone hydrogel contact lens products include one or more additive agents that can be removed from a polymerized silicone hydrogel contact lens product during an extraction procedure.

The term "additive" in the context of the present application means a compound or chemical agent provided in the present polymerizable silicone hydrogel contact lens precursor compositions or pre-extracted polymerized silicone hydrogel contact lens products, but which is not necessary for the manufacture of a silicone hydrogel contact lens. However, inclusion of a removable additive may facilitate the processing of the contact lens during the manufacture thereof, may enhance one or more properties of the silicone hydrogel contact lens compared to a silicone hydrogel contact lens obtained from the same precursor composition without the additive, or combinations thereof. As used herein, an additive is removable from a pre-extracted polymerized silicone hydrogel contact lens product. For example, an additive can be substantially unreactive or non-reactive with the other components of the polymerizable silicone hydrogel lens precursor composition. For example, the additive does not substantially become a covalently bound, integral part of the resulting polymerized lens product. Depending upon their molecular weight and shape, most, if not all, of the present additives are extractable from the polymerized silicone hydrogel contact lens product. Therefore, the additives in the present compositions can be extracted from a polymerized silicone hydrogel contact lens product during an extraction procedure.

In certain embodiments, additives may be referred to as diluents, substantially non-reactive agents, or extractables. Diluents can be alcohols or non-alcohol agents. Diluents can be present in amounts from about 1% to about 60% (w/w) of the lens precursor composition. Other non-diluent based additives can be present in amounts less than 10% (w/w) if desired. The additives provided in the present compositions can aid the formation of polymerizable silicone hydrogel contact lens precursor compositions, such as by facilitating formation of a homogenous composition or a non-phase separated composition; can enhance the processability of the present pre-extracted polymerized silicone hydrogel contact lens products, such as by facilitating demolding of the contact lens molds containing the contact lens products and/or facilitating delensing of the contact lens product from a contact lens mold; can improve the control of physical parameters of the contact lens, such as by reducing variability in contact lens physical parameter among a population of contact lenses, for example, among different batches of contact lenses; can enhance the wettability of contact lenses, such as by enhancing the wettability of a contact lens surface; can positively affect the modulus of contact lenses, such as by reducing the modulus or increasing the modulus, as desired; and can positively affect the ionoflux of the contact lenses, such as by reducing the ionoflux of contact lenses compared to contact lenses obtained from lens products which do not include an additive. Thus, additives provided in the present compositions may be understood to be compatibilizers, demolding aids, delensing aids, physical parameter controllers, wettability enhancing agents, modulus influencing agents, ionoflux reducing agents, or combinations thereof. The enhancements or improvements obtained with the present additives are apparent when compared to an identical polymerizable silicone hydrogel contact lens precursor composition or pre-extracted polymerized silicone hydrogel contact lens products lacking such additive, or silicone hydrogel contact lenses obtained from such polymerizable compositions or polymerized products.

The compatibilizers disclosed herein improve or enhance the miscibility of the components of the present precursor compositions. For example, the compatibilizers can reduce phase separation associated with the silicon-containing polymers and the other lens forming components compared to formulations without compatibilizers.

Providing removable additives in certain of the present polymerizable compositions and polymerized products facilitates production of silicone hydrogel contact lenses with ophthalmically compatible surface wettabilities, among other things, without exposing the contact lens or lens product to a surface treatment or without including an IPN of a polymeric wetting agent, such as PVP. For example, the additive is homogenously distributed throughout the polymerization composition and is substantially, if not completely, removed from the entire polymerized product during an extraction procedure. In addition, the additives described herein are not polymeric wetting agents that are mixed with the prepolymerized composition and subsequently mixed into a polymerized object to form an IPN. The present contact lenses can be produced with little physical or dimensional variability from batch to batch thereby improving the yield of clinically acceptable, ophthalmically compatible silicone hydrogel contact lenses. Additives can be in liquid or solid form, and include hydrophobic or amphiphilic compounds or agents.

Additives, including diluents, useful in the present compositions and lens products can have hydrophilic groups linked with hydrophobic groups, for example, hydroxyl groups with alkane chain, siloxane molecular backbones linked with hydrophilic PEG section, and the like. Examples of additives, include without limitation, polydimethylsiloxane-co-PEG polymers of a molecular weight of about 10,000 Daltons or less, ethylene glycol stearate, diethylene glycol monolaurate, $C_2$-$C_{24}$ alcohols and/or $C_2$-$C_{24}$ amines. Additives can also contain one or more polar or hydrophilic end groups such as, without limitation, hydroxyl, amino, sulfhydryl, phosphate and carboxylic groups to facilitate miscibility of the additives with other materials present in the compositions. The additives can be present in the polymerizable silicone hydrogel precursor composition in an amount from about 2% (w/w) to about 60% (w/w). For example, a composition may comprise one or more additives present in an amount from about 5% to about 50% (w/w). Further examples of the polymerizable compositions comprise one or more additives present in an amount of about 20% or about 25% or about 30% or about 35% or about 40% or about 45% or about 50% or about 55%.

The present silicone hydrogel contact lenses comprise lens bodies having ophthalmically acceptable surface wettabilities. For example, a lens body of the present silicone hydrogel contact lenses can have an anterior surface and a posterior surface, each surface having an ophthalmically acceptable surface wettability.

In one embodiment, a lens body of a silicone hydrogel contact lens comprises a silicone hydrogel material. The lens body has a dry weight no greater than 90% of the dry weight of the lens body prior to extraction. For example, a lens body of pre-extracted polymerized silicone hydrogel contact lens product may have a dry weight of X. After an extraction procedure, the lens body of the extracted polymerized silicone hydrogel contact lens product has a dry weight less than or equal to 0.9X. As discussed herein, the pre-extracted polymerized silicone hydrogel contact lens product may be contacted with volumes of multiple organic solvents and hydrated to produce a silicone hydrogel contact lens. The hydrated silicone hydrogel contact lens can then be dehydrated and weighed to determine the dry weight of the lens body of the silicone hydrogel contact lens. For example, in certain methods, a pre-extracted polymerized silicone hydrogel contact lens product is delensed from a contact lens mold member and is weighed to provide the dry weight of the pre-extracted polymerized silicone hydrogel contact lens product. The pre-extracted lens product is then contacted with alcohol for about 6 hours and then is hydrated with water. The hydrated lens is then dried at about 80° C. for about 1 hour, and then dried under a vacuum at about 80° C. for about 2 hours. The dried lens is weighed to determine the dry weight of the lens body of the silicone hydrogel contact lens. The dry weights are compared to determine the amount of extractable material present in pre-extracted polymerized silicone hydrogel contact lens product. A pre-extracted polymerized lens product having an extractable component content of about 40% produces a lens body of a silicone hydrogel contact lens having a dry weight that is about 60% of the pre-extracted lens product. A pre-extracted polymerized lens product having an extractable component content of about 70% produces a lens body of a silicone hydrogel contact lens having a dry weight that is about 30% of the pre-extracted lens product.

The amount of extractables, or the extractable component content, present in a pre-extracted polymerized silicone hydrogel contact lens product can be determined using the following equation:

$$E = ((\text{Dry weight of the pre-extracted lens product} - \text{Dry weight of extracted and hydrated contact lens}) / \text{Dry weight of the pre-extracted lens product}) \times 100.$$

E is the percentage of extractables present in the pre-extracted lens product.

For example, a pre-extracted polymerized silicone hydrogel contact lens product may have a dry weight of about 20 mg. If a silicone hydrogel contact lens obtained from that product has a dry weight of about 17 mg, that silicone hydrogel contact lens comprises a lens body having a dry weight that is 85% of the dry weight of the pre-extracted lens product. It can be understood that such a pre-extracted lens product has an extractable component content of about 15% (w/w). As another example, a pre-extracted polymerized silicone hydrogel contact lens product may have a dry weight of about 18 mg, and if the dehydrated silicone hydrogel contact lens obtained from the lens product has a dry weight of about 13 mg, the silicone hydrogel contact lens comprises a lens body having a dry weight that is about 72% of the pre-extracted lens product. Such a pre-extracted polymerized silicone hydrogel contact lens product has an extractable component content of about 28% (w/w).

In certain embodiments, the dry weight of the lens body of the silicone hydrogel contact lens (i.e., a silicone hydrogel contact lens that has undergone an extraction and hydration procedure) is greater than 25% of the dry weight of the lens body prior to extraction. For example, the dry weight of the post-extracted lens body may be from about 25% to about 90% of the dry weight of the pre-extracted lens body. Some embodiments of the present lenses comprise lens bodies having a dry weight from about 50% to about 85% of the dry weight of the pre-extracted lens body.

As discussed herein, silicone hydrogel contact lenses obtained from lens precursor compositions or pre-extracted silicone hydrogel contact lens products that are free of removable additives (e.g., lens products obtained from "bulk formulations"), can have ophthalmically acceptable surface wettabilities when the extractable component content in the pre-extracted lens product is greater than 10%, such as at least 15%, at least 20%, at least 25% or more. The inclusion of one or more removable additives to the precursor composition or the polymerized pre-extracted lens product increases the extractable component content compared to the bulk formulation lens products and results in silicone hydrogel contact lenses with ophthalmically acceptable surface wettabilities. Thus, the present silicone hydrogel contact lenses that comprise lens bodies having a dry weight that is no greater than 90% of the dry weight of the lens body prior to extraction can be understood to be contact lenses obtained from bulk formulations and contact lenses obtained from formulations or lens products that include one or more removable agents.

In comparison, previous descriptions of silicone hydrogel contact lenses that are obtained from diluent-containing formulations do not include diluent-free formulations that have high extractable component contents. Such lenses often require a surface treatment or a polymeric IPN to provide an ophthalmically acceptable surface wettability on the silicone hydrogel contact lens.

Although the present pre-extracted polymerized silicone hydrogel contact lens products have relatively large amounts of extractable materials, the extracted forms of the present silicone hydrogel contact lenses have very little extractable materials in the lens bodies. In certain embodiments, the amount of extractable materials remaining in an extracted lens is from about 0.1% to about 4%, such as about 0.4% to about 2% (w/w). These additional extractable materials can be determined by contacting an extracted contact lens with an additional volume of a strong solvent, such as chloroform.

When a lens body of a silicone hydrogel contact lens has a dry weight that is not greater than 90% of the dry weight of the pre-extracted lens body, the hydrated lens body of the silicone hydrogel contact lens is ophthalmically compatible and has an ophthalmically acceptable surface wettability. In comparison, when a pre-extracted silicone hydrogel contact lens product that has a removable component content that is less than 10% (w/w), such as about 5-8% (w/w), of the lens product is obtained from a non-polar resin contact lens mold, the hydrated silicone hydrogel contact lens so produced does not have an ophthalmically acceptable surface wettability. Thus, such non-wettable lenses may be understood to be lenses that comprise lens bodies having a dry weight greater than 90%, such as 92%, of the dry weight of the pre-extracted lens bodies.

In addition, since the extractable component is present in, and distributed throughout the polymerizable silicone hydrogel lens precursor composition and the pre-extracted polymerized silicone hydrogel contact lens product, the present lens products and contact lenses can be distinguished from surface treated silicone hydrogel contact lenses. Since the extractable component is extractable from the lens products and is substantially absent from the hydrated contact lens, the present lens products and contact lenses can be distinguished from silicone hydrogel contact lenses that have a polymeric wetting agent IPN.

The present silicone hydrogel contact lenses may comprise lens bodies obtained from non-polar resin contact lens molds that have substantially identical surface morphologies when examined in hydrated and dehydrated states. In addition, such hydrated lens bodies may have a surface roughness that is slightly less than the surface roughness of the dehydrated lens bodies. For example, the lens bodies of the present lenses may have surfaces that include nanometer sized peaks that are apparent when analyzing root mean square (RMS) roughness data of the lens surfaces. The lens bodies may comprise regions between such peaks that differentially swell compared to the peaks to provide a reduced roughness but a substantially similar surface morphology. For example, although the height of the peaks may be reduced as the lens body is hydrated, the shape of the peak remains substantially the same.

In addition or alternatively, embodiments of the present non-polar resin molded silicone hydrogel contact lenses may comprise lens bodies that have visually identifiable silicon-rich domains and silicon-poor domains when viewed with an electron microscope, such as a scanning electron microscope, a transmission electron microscope, or a scanning transmission electron microscope. The silicon-poor domains can be understood to be regions within the lens that are substantially or entirely free of silicon based on chemical analysis. The silicon-poor domains may be larger than such domains in surface treated silicone hydrogel contact lenses or silicone hydrogel contact lenses that comprise an IPN of a polymeric wetting agent. The sizes of the silicon-rich domains, silicon-poor domains, or both may be determined using conventional image analysis software and devices, such as image analysis systems available from Bioquant (Tennessee). The image analysis software systems can be used to outline the borders of the silicon-rich and silicon-poor domains and determine cross-sectional areas, diameters, volumes, and the like of the domains. In certain embodiments, the silicon-poor domains have cross-sectional areas that are at least 50%, at least 60%, at least 70%, at least 80%, or at least 90% greater than silicon-poor domains of other silicone hydrogel contact lenses.

In another embodiment, a silicone hydrogel contact lens comprises a lens body that is obtained from a pre-extracted polymerized silicone hydrogel contact lens product that has a removable component content of at least 10% (w/w) of the lens product. The lens body of the pre-extracted polymerized silicone hydrogel contact lens product can be free of or comprise no removable or non-reactive additives, such as diluents, compatibizers, and the like. Such lens bodies can be obtained from bulk formulations, as discussed herein. These lens bodies have a removable component content of at least 10% (w/w), and in certain embodiments, the lens body has a removable component content of at least 15% (w/w), at least 20% (w/w), at least 25% (w/w), about 30% (w/w), or more. For example, in certain embodiments, the pre-extracted polymerized contact lens product has an extractable component content from 10% (w/w) to about 30% (w/w) and is free of a non-reactive additive. In additional embodiments, the pre-extracted polymerized contact lens product has an extractable component content from 15% (w/w) to about 30% (w/w) and is free of a non-reactive additive. In additional embodiments, the lens body can include one or more non-reactive additives and can have a removable component content that is greater than the amount present in a similar lens body that is free of non-reactive additives. In certain embodiments, the removable component content is no greater than 75% (w/w) of the lens product. Thus, embodiments of the present silicone hydrogel contact lenses comprise a lens body obtained from a pre-extracted polymerized silicone hydrogel contact lens product that has a removable component content greater than 10% (w/w) and no greater than 75% (w/w). For example, some pre-extracted polymerized silicone hydrogel contact lens products may have a removable component content from about 15% (w/w) to about 65% (w/w). The removable component includes extractable materials, or extractables, that are extracted during an extraction procedure. In addition, the removable component can include other materials, such as volatile materials, that may be passively or actively removed from the pre-extracted polymerized silicone hydrogel contact lens product prior to extraction. For example, a portion of the removable component may evaporate between the demolding step and the extraction step.

In certain embodiments, the removable component of the pre-extracted polymerized silicone hydrogel contact lens product includes at least one removable additive. As discussed herein, the removable additives may be non-reactive additives, or reactive additives which produce products that are removable from the pre-extracted polymerized silicone hydrogel contact lens product. Examples of removable additives that are included in embodiments of the present pre-extracted polymerized silicone hydrogel contact lens product include compatibilizers, demolding aids, delensing aids, wettability enhancers, ionoflux reducers, modulus influencing agents, chain transfer agents, and combinations thereof.

In certain embodiments, the removable component comprises a hydrophobic additive, an amphiphilic additive, or combinations thereof. For example, the removable component may comprise one or more additives selected from the group consisting of unreactive alcohols, unreactive hydrophilic silicone polymers, and combinations thereof. As a further example, the additives may be selected from the group consisting of ethylene glycol stearate, diethylene glycol monolaurate, $C_2$-$C_{24}$ alcohols, $C_2$-$C_{24}$ amines, polydimethylsiloxane-co-PEG, and combinations thereof. In some embodiments, the additive is selected from the group consisting of decanol, ethoxy ethanol, polydimethylsiloxane-co-PEG, and combinations thereof. It can be understood that in at least some embodiments, the additive is an agent other than a polymerized composition that is mixed with the polymerizable silicone hydrogel contact lens precursor composition during formation of the lens body.

Polydimethylsiloxane-co-PEG (PDMS-co-PEG) can be understood to be a hydrophilic silicone containing agent and is also referred to herein as silicone oil. These hydrophilic silicone agents are generally soluble in water and alcohols. Hydrophilic silicone-containing agents useful in the present compositions and lens products can be understood to be compatibilizers. In addition, such agents can be understood to be demolding aids and delensing aids. For example, polymerized silicone hydrogel contact lens products produced with hydrophilic silicone-containing agents selectively adhere to a single mold member, such as the male mold member of the contact lens mold, and are easier to delens from the mold member. In addition, silicone oil can reduce the water content in the silicone hydrogel contact lens compared to lenses produced from compositions without silicone oil, can help retain wettability of a silicone hydrogel contact lens, and can reduce the ionoflux of the contact lens. Typically, the silicone oil provided in the present formulations and lens products have a molecular weight less than about 3000 daltons. For example, silicone oils in the present compositions and products may have a molecular weight from about 100 daltons to about 3000 Daltons. In some embodiments, the silicone oil has a molecular weight from about 300 daltons to about 1000 daltons. In some specific embodiments, the silicone oil has a molecular weight of about 600 daltons and has a non-siloxane content of about 75%. The silicone oil can be understood to be a surfactant, and can be understood to be an agent with a silicon-containing backbone coupled to a long PEG chain.

In another embodiment, a silicone hydrogel contact lens comprises a lens body produced by a process that comprises extracting an extractable component from a pre-extracted polymerized silicone hydrogel contact lens product to produce an extracted polymerized silicone hydrogel contact lens product. The extractable component is provided in an amount of at least 10% (w/w) of the pre-extracted polymerized silicone hydrogel contact lens product. The process of producing the lens body further comprises hydrating the extracted polymerized silicone hydrogel contact lens product to produce a silicone hydrogel contact lens having an ophthalmically acceptable surface wettability.

As discussed herein, the extractable component can be present in an amount from 10% to about 75% (w/w) of the pre-extracted polymerized silicone hydrogel contact lens product. Or, the pre-extracted polymerized silicone hydrogel contact lens product can be understood to have an extractable component content from 10% to about 75% (w/w). For example, the extractable component can be present in an amount from about 15% to about 65% (w/w) of the pre-extracted polymerized silicone hydrogel contact lens product.

In certain embodiments, the extractable component of the pre-extracted polymerized silicone hydrogel contact lens product includes at least one removable additive, as described herein. For example, the extractable component can include compatibilizers, demolding aids, delensing aids, wettability enhancers, ionoflux reducers, modulus influencing agents, and combinations thereof, as described herein.

Certain embodiments of the present lenses comprise lens bodies that are free of a surface treatment that provides an ophthalmically acceptable surface wettability. In other words, the lens body of the present silicone hydrogel contact lenses can be an un-surface treated lens body. Or, the lens body is produced without surface treating the lens body to provide an ophthalmically acceptable surface wettability. For example, the lens bodies of embodiments of the present lenses do not include a plasma treatment or an additional coating provided to make the surface of the lens body more ophthalmically acceptable. However, since the present lenses have ophthalmically acceptable surface wettabilities due to the amount of removable materials present in the pre-extracted polymerized silicone hydrogel contact lens products, some embodiments may include surface treatments, if desired.

In addition, embodiments of the present lenses comprise lens bodies that are free of an interpenetrating polymer network of a polymeric wetting agent that provides an ophthalmically acceptable surface wettability. In other words, the lens bodies of embodiments of the present lenses have ophthalmically acceptable surface wettabilities and do not include an IPN of a polymeric wetting agent, such as polyvinyl pyrollidone (PVP). For example, the lens bodies of the present lenses can be produced without contacting the present polymerizable silicone hydrogel lens precursor compositions with a polymeric wetting agent to form an interpenetrating polymer network.

Certain embodiments of the present lenses comprise lens bodies that are cast molded elements obtained from a non-polar resin contact lens mold. It can be understood that the polymerized silicone hydrogel contact lens product is a product that was polymerized or cured in a non-polar resin contact lens mold. Or, stated another way, the polymerized silicone hydrogel contact lens product is produced in a non-polar resin contact lens mold. As discussed herein, such contact lens molds are molds that are produced using or are based on non-polar or hydrophobic resin materials. Such materials typically have relatively large contact angles on their lens forming surfaces. For example, the non-polar resin or hydrophobic resin mold may have a contact angle greater than about 90 degrees. Examples of suitable non-polar resin mold materials useful in these embodiments of lenses include resin materials that include one or more polyolefins. Some examples of suitable resin materials include polyethylene, polypropylene, and polystyrene, and other materials having similar hydrophobic properties. Non-polar resin based molds are not based on polar resins, such as polyvinyl alcohol or ethylenevinyl alcohol copolymer.

In further embodiments, the present lenses comprise lens bodies that include combinations of the foregoing features. For example, a silicone hydrogel contact lens may comprise a lens body that is free of a surface treatment, and free of an IPN of a polymeric wetting agent. As another example, a silicone hydrogel contact lens may comprise a lens body that is free of a surface treatment, free of an IPN of a polymeric wetting agent, and is a cast molded element obtained from non-polar resin contact lens mold.

Some embodiments of the present silicone hydrogel contact lenses may also include one or more comfort enhancing agents that enhance the comfort of the contact lens perceived by a lens wearer or group of lens wearers relative to silicone hydrogel contact lenses without the comfort enhancing agents. One example of a comfort enhancing agent that can be included in the present lenses is a dehydration reducing agent. Another example of a comfort enhancing agent is a tear film stabilizer. Another example of a comfort enhancing agent is an agent that reduces dehydration and stabilizes tear film of an eye on which the contact lens is placed. The comfort enhancing agents include polymeric materials that have an affinity for water. In certain embodiments, the polymeric materials are derived from units of amphiphilic materials. Examples of suitable materials include polymerizable phospholipids, such as materials that include a phosphorylcholine component. In certain embodiments, the present lenses comprise a lens body that comprises units of a methacrylate phosphorylcholine-monomer. In further embodiments, the lens body comprises 2-methacryloyloxyethyl phosphorylcholine (MPC). MPC can be obtained from companies such as Biocompatibles Limited (Great Britain) and NOF Corporation (Tokyo, Japan), or can be produced as described in U.S. Pat. Nos. 5,981,786; 6,420,453; and 6,423,761.

As discussed herein, comfort of the present silicone hydrogel lenses can also be enhanced by including one or more removable comfort enhancing agents in the lens precursor compositions and pre-extracted silicone hydrogel contact lens products. For example, some of the removable materials described herein include agents that reduce the ionoflux of the present lenses compared to lenses obtained from the same compositions without the removable materials. Reducing the ionoflux of the lenses can be helpful in reducing corneal dehydration of the lens wearer and reducing corneal staining resulting from wearing the lenses.

As discussed herein, the present lenses have features and properties that permit the lenses to be worn for prolonged periods of time. For example, the present lenses can be worn as daily wear lenses, weekly wear lenses, bi-weekly wear lenses, or monthly wear lenses. The present lenses comprise hydrated lens bodies that have surface wettabilities, moduli, ionofluxes, oxygen permeabilities, and water contents that contribute to the comfort and usability of the lenses. In certain embodiments, the present lenses comprise a hydrated lens body that has a feature selected from the group consisting of an advancing contact angle less than about 95 degrees, a tensile modulus less than about 1.6 MPa, an ionoflux less than about $7 \times 10^{-3}$ mm$^2$/min, an oxygen permeability (Dk) of at least about 70 barrers, a water content of at least about 30% by weight, and combinations thereof. However, in other embodiments, the ionoflux may be greater than $7 \times 10^{-3}$ mm$^2$/min and still not cause corneal dehydration staining or other clinical problems. For example, when silicone hydrogel contact lenses comprise a comfort enhancing agent, such as a phosphorylcholine component, such as MPC, the ionoflux can be about $25 \times 10^{-3}$ mm$^2$/min and still be clinically acceptable.

The present lenses may comprise hydrated lens bodies that have an advancing contact angle on an anterior surface, a posterior surface, or anterior and posterior surface less than 120 degrees. In certain embodiments, the lens bodies have a lens surface advancing contact angle less than 90 degrees, for example, the lens bodies have a lens surface advancing contact angle of about 85 degrees, about 80 degrees, about 75 degrees, about 70 degrees, about 65 degrees, about 60 degrees, about 55 degrees, or about 50 degrees. The lens bodies may also have a lens surface receding contact angle less than 80 degrees, for example, the lens body may have a lens surface receding contact angle of about 75 degrees, about 70 degrees, about 65 degrees, about 60 degrees, about 55 degrees, about 50 degrees, or about 45 degrees. The hysteresis, that is the difference between the advancing contact angle and the receding contact angle, can be from about 5 degrees to about 35 degrees. However, in certain embodiments, the hysteresis may be greater than 25 degrees and still be clinically acceptable. For example, when silicone hydrogel contact lenses comprise a comfort enhancing agent, such as a phosphorylcholine component, such as MPC, the hysteresis can be about 60 degrees and the lens can still be clinically acceptable.

The advancing contact angle can be determined using routine methods known to persons of ordinary skill in the art. For example, the advancing contact angles and receding contact angles of the contact lenses can be measured using a conventional drop shape method, such as the sessile drop method or captive bubble method. Advancing and receding water contact angles of silicone hydrogel contact lenses can be determined using a Kruss DSA 100 instrument (Kruss GmbH, Hamburg), and as described in D. A. Brandreth: "Dynamic contact angles and contact angle hysteresis", Journal of Colloid and Interface Science, vol. 62, 1977, pp. 205-212 and R. Knapikowski, M. Kudra: Kontaktwinkelmessungen nach dem Wilhelmy-Prinzip-Ein statistischer Ansatz zur Fehierbeurteilung", Chem. Technik, vol. 45, 1993, pp. 179-185, and U.S. Pat. No. 6,436,481.

As an example, the advancing contact angle and receding contact angle can be determined using a captive bubble method using phosphate buffered saline (PBS; pH=7.2). The lens is flattened onto a quartz surface and rehydrated with PBS for 10 minutes before testing. An air bubble is placed onto a lens surface using an automated syringe system. The size of the air bubble can be increased and decreased to obtain the receding angle (the plateau obtained when increasing the bubble size) and the advancing angle (the plateau obtained when decreasing the bubble size).

The present lenses may, in addition or alternatively, comprise lens bodies that exhibit a water break up time (BUT) greater than 5 seconds. For example, embodiments of the present lenses comprising lens bodies with a water BUT of at least 15 seconds, such as 20 seconds or more, can have ophthalmically acceptable surface wettabilities.

The present lenses may comprise lens bodies having moduli less than 1.6 MPa. In certain embodiments, the modulus of the lens bodies is less than 1.0 MPa. For example, the lens body may have a modulus of about 0.9 MPa, about 0.8 MPa, about 0.7 MPa, about 0.6 MPa, about 0.5 MPa, about 0.4 MPa, or about 0.3 MPa. One example of the present silicone hydrogel contact lenses has a modulus of 0.55 MPa. The modulus of the lens body is selected to provide a comfortable lens when placed on an eye and to accommodate handling of the lens by the lens wearer.

The modulus of a lens body can be determined using routine methods known to persons of ordinary skill in the art. For example, pieces of a contact lens having about 4 mm width can be cut out from a central part of lens and tensile modulus (unit; MPa) can be determined from an initial slope of a stress-strain curve obtained by tensile test at the rate of 10 mm/min in air at a humidity of at least 75% at 25° C., using an Instron 3342 (Instron Corporation).

The ionoflux of the lens bodies of the present lenses can be less than $5 \times 10^{-3}$ mm$^2$/min. Although the lens body of some of the present lenses may have an ionoflux up to about $7 \times 10^{-3}$ mm$^2$/min, it is believed that when the ionoflux is less than about $5 \times 10^{-3}$ mm$^2$/min and when the contact lenses do not include MPC, corneal dehydration and staining can be reduced. In certain embodiments, the ionoflux of the lens body is about $4.5 \times 10^{-3}$ mm$^2$/min, about $4 \times 10^{-3}$ mm$^2$/min, about $3.5 \times 10^{-3}$ mm$^2$/min, about $3 \times 10^{-3}$ mm$^2$/min, or less. However, as described herein, the ionoflux may be greater than $7 \times 10^{-3}$ mm$^2$/min and still not cause corneal dehydration staining or other clinical problems. For example, when silicone hydrogel contact lenses comprise a comfort enhancing agent, such as a phosphorylcholine component, such as MPC, the ionoflux can be about $25 \times 10^{-3}$ mm$^2$/min and still be clinically acceptable.

The ionoflux of the lens bodies of the present lenses can be determined using routine methods known to persons of ordinary skill in the art. For example, the ionoflux of a contact lens or lens body can be measured using a technique substantially similar to the "Ionoflux Technique" described in U.S. Pat. No. 5,849,811. For example, the lens to be measured can be placed in a lens-retaining device, between male and female portions. The male and female portions include flexible sealing rings which are positioned between the lens and the respective male or female portion. After positioning the lens in the lens-retaining device, the lens-retaining device is placed in a threaded lid. The lid is screwed onto a glass tube to define a donor chamber. The donor chamber can be filled with 16 ml of 0.1 molar NaCl solution. A receiving chamber can be filled with 80 ml of deionized water. Leads of the conductivity meter are immersed in the deionized water of the receiving chamber and a stir bar is added to the receiving chamber. The receiving chamber is placed in a thermostat and the temperature is held at about 35° C. Finally, the donor chamber is immersed in the receiving chamber. Measurements of conductivity can be taken every 2 minutes for about 20 minutes, starting 10 minutes after immersion of the donor chamber into the receiving chamber. The conductivity versus time data should be substantially linear.

The lens bodies of the present lenses typically have a high oxygen permeability. For example, the lens bodies have an oxygen permeability of Dk no less than 60 barrers. Embodiments of the present lenses comprise a lens body having a Dk of about 80 barrers, about 90 barrers, about 100 barrers, about 110 barrers, about 120 barrers, about 130 barrers, about 140 barrers, or more.

The Dk of the present lenses can be determined using routine methods known to persons of ordinary skill in the art. For example, the Dk value can be determined using the Mocon Method, as described in U.S. Pat. No. 5,817,924. The Dk values can be determined using a commercially available instrument under the model designation of Mocon Ox-Tran System.

The present lenses also comprise lens bodies having ophthalmically acceptable water contents. For example, embodiments of the present lenses comprise lens bodies having a water content no less than 30%. In certain embodiments, the lens body has a water content of about 35%, about 40%, about 45%, about 50%, about 55%, about 60%, or about 65%.

The water content of the present lenses can be determined using routine methods known to persons of ordinary skill in the art. For example, a hydrated silicone hydrogel contact lens can be removed from an aqueous liquid, wiped to remove excess surface water, and weighed. The weighed lens can then be dried in an oven at 80 degrees C. under a vacuum, and the dried lens can then be weighed. The weight difference is determined by subtracting the weight of the dry lens from the weight of the hydrated lens. The water content (%) is the (weight difference/hydrated weight)×100.

In addition to the specific values identified above, the present lenses can have values in a range between any combinations of the above-identified specific values. For example, the present contact lenses can have water contents from about 45% to about 55%, ionoflux values from about 3.9 to about 5.3, static contact angles from about 35 degrees to about 45 degrees, advancing contact angles from about 55 degrees to about 75 degrees, receding contact angles from about 47 degrees to about 55 degrees, hysteresis from about 11 degrees to about 25 degrees, Young's moduli from about 0.47 MPa to about 0.51 MPa, elongation from about 140% to about 245%, and combinations thereof.

In some specific embodiments of the present silicone hydrogel contact lenses, the lens bodies have a water BUT greater than 20 seconds, a modulus less than 0.5 MPa, an ionoflux less than 5, and a water content of about 55%.

The present silicone hydrogel contact lenses are vision correcting or vision enhancing contact lenses. The lenses may be spheric lenses or aspheric lenses. The lenses may be monofocal lenses or multifocal lenses, including bifocal lenses. In certain embodiments, the present lenses are rotationally stabilized lenses, such as a rotationally stabilized toric contact lens. A rotationally stabilized contact lens may be a contact lens that comprises a lens body that includes a ballast. For example, the lens body may have a prism ballast, a periballast, and/or one or more thinned superior and inferior regions.

The present lenses also comprise lens bodies that include a peripheral edge region. The peripheral edge region may include a rounded portion. For example, the peripheral edge region may comprise a rounded posterior edge surface, a rounded anterior edge surface, or a combination thereof. In certain embodiments, the peripheral edge is completely rounded from the anterior surface to the posterior surface. Therefore, it can be understood that the lens body of the present lenses may comprise a rounded peripheral edge.

The present lenses may comprise lens bodies with thickness profiles that address problems associated with existing silicone hydrogel contact lenses but that are still comfortable to the lens wearer. By varying the thicknesses of the lens bodies and the moduli of the lens bodies, the stiffness of the lens bodies can be controlled. For example, the stiffness for a region of a contact lens can be defined as the product of the Young's modulus of the lens and the square of the thickness of the lens at a specified region. Thus, certain embodiments of the present lenses may comprise lens bodies having a center stiffness (e.g., the stiffness at the center of the lens or center of the optic zone) less than about 0.007 MPa-mm$^2$, a lenticular junction stiffness less than about 0.03 MPa-mm$^2$, or a combination thereof. A lenticular junction can be defined as the junction of the lenticular zone with a bevel or, for lenses without a bevel, a point about 1.2 mm from the lens edge (see U.S. Pat. No. 6,849,671). In other embodiments, the present lenses may comprise lens bodies having a center stiffness greater than 0.007 MPa-mm$^2$, a lenticular junction stiffness greater than about 0.03 MPa-mm$^2$, or a combination thereof.

The present silicone hydrogel contact lenses can have little variability in physical parameters, such as physical dimensions and the like, among the lenses or among batches of lenses. For example, in certain embodiments, additives can be added to the polymerizable silicone hydrogel contact lens precursor composition to reduce the variability in physical attributes of the lenses. Using such physical parameter controlling additives, the variability between any two batches of lenses can be less than 2%. For example, the variability for one or more batches of the present lenses can be from about 0.5% to about 1.9%. For example, the diameter and base curve of the present lenses can be controlled within 1.6% of a pre-determined value. More specifically, if a target contact lens diameter is 14.0 mm, and if the actual diameter of contact lenses in a batch of contact lenses varies from about 13.6 mm to about 14.4 mm, one or more additives can be used during the production of the contact lens to reduce the variability, and produce contact lenses having diameters that range from about 13.8 mm to about 14.2 mm. Similar control can be provided to reducing variation in lens thickness, sagittal depth, base curvature, and the like. The additive can be a diluent or compatibilizer and can be provided in an amount of up to about 5% (w/w). Thus, the addition of a diluent or other additive can be useful to reduce or control distortion among the present contact lenses. In addition, the diluent or additive, as well as altering the active or reactive ingredients present in the polymerizable composition can be useful to target physical properties, such as modulus, of lenses among different batches of lenses.

The present silicone hydrogel contact lenses may be provided in a sealed package. For example, the present silicone hydrogel contact lenses may be provided in sealed blister packs or other similar containers suitable for delivery to lens wearers. The lenses may be stored in an aqueous solution, such as a saline solution, within the package. Some suitable solutions include phosphate buffered saline solutions and borate buffered solutions. The solutions may include a disinfecting agent if desired, or may be free of a disinfecting or preservative agent. The solutions may also include a surfactant, such as a poloxamer and the like, if desired.

The lenses in the sealed packages are preferably sterile. For example, the lenses can be sterilized prior to sealing the package or can be sterilized in the sealed package. The sterilized lenses may be lenses that have been exposed to sterilizing amounts of radiation. For example, the lenses may be autoclaved lenses, gamma radiated lenses, ultraviolet radiation exposed lenses, and the like.

Another aspect of the present invention relates to pre-extracted polymerized silicone hydrogel contact lens products. For example, the lens products that have been polymerized and have not undergone an extraction procedure, as described herein.

As discussed above, producing pre-extracted polymerized silicone hydrogel contact lens products with a relatively high amount of removable materials, such as extractables and the like, results in silicone hydrogel contact lenses that have ophthalmically acceptable surface wettabilities, even when the lenses are produced using non-polar resin contact lens molds, and do not include a surface treatment of IPN of a polymeric wetting agent.

Embodiments of the present pre-extracted polymerized silicone hydrogel contact lens products comprise a pre-extracted body member that has a dry weight that is at least 10% greater than the dry weight of the body member after subjecting the body member to an extraction procedure to form an extracted polymerized silicone hydrogel contact lens product. For example, the pre-extracted polymerized silicone hydrogel contact lens product has an extractable component content of at least 10% (w/w) of the lens product. In certain embodiments, the pre-extracted polymerized silicone hydrogel contact lens product has an extractable component content no greater than 75% of the lens product. In further embodiments, the extractable component content is from about 15% to about 65% (w/w) of the extracted lens product. In still further embodiments, the extractable component content is from about 15% to about 50% (w/w) of the extracted lens product.

Since the present lenses can be obtained from non-polar resin contact lens mold members, embodiments of the present pre-extracted silicone hydrogel contact lens products include such products provided in contact with a non-polar resin contact lens mold member. For example, an embodiment can be the pre-extracted product provided in a closed contact lens mold, or a pre-extracted product provided on one mold member of a demolded contact lens mold. In some embodiments, the pre-extracted lens product is in contact with a male contact lens mold member.

Embodiments of the present pre-extracted silicone hydrogel contact lens products also include a body member that comprises one or more removable additives, such as non-reactive additives. The additives include each and every additive described above, including combinations of such additives. Thus, it can be understood that the pre-extracted lens products may comprise one or more additives selected from the group consisting of compatibilizers, demolding aids, delensing aids, wettability enhancers, ionoflux reducers, comfort agents, and combinations thereof.

In certain embodiments, the lens product comprises a pre-extracted body member that comprises units of a methacrylate phosphorylcholine-monomer, such as 2-methacryloyloxyethyl phosphorylcholine.

Another aspect of the present invention relates to polymerizable silicone hydrogel contact lens precursor compositions. The present precursor compositions can comprise a polymerizable silicon-containing component and a polymerizable non-silicon-containing component. The two components are combined as a polymerizable silicone hydrogel contact lens precursor composition. A portion of the precursor composition is removable from a polymerized silicone hydrogel contact lens product produced from the precursor composition. The removable portion is present in an amount of at least 10% (w/w) of the polymerized silicone hydrogel contact lens product.

In certain embodiments, the non-silicon-containing component of the precursor composition comprises a first monomer having a first reactivity ratio, and a second monomer having a second reactivity ratio that is less than the first reactivity ratio. For example, if the first monomer has a reactivity ratio of about 3, the second monomer has a reactivity ratio less than about 3. The second reactivity ratio can be about 10% less, about 20% less, about 30% less, about 40% less, about 50% less, about 60% less, about 70% less, about 80% less, or about 90% less than the first reactivity ratio. In one embodiment, the second monomer has a reactivity ratio of 0.5 and the first monomer has a reactivity ratio of 3. The present lens products and lenses can be produced by using reactive components with different reactivity ratios during the formation of the polymerized product. It can be understood that the component with the higher reactivity ratio is generally more reactive than the component with the lower reactivity ratio, and so more of the first component with the higher reactivity ratio will be reacted in a given amount of time. In certain embodiments, the precursor compositions also comprise a cross-linking agent that has a reactivity ratio that is more similar to the first reactivity ratio than the second reactivity ratio. Therefore, the types of reactive components in the present precursor compositions can influence the amount of the removable component present in the polymerized lens products, the dry weight of the present silicone hydrogel contact lenses, and the wettability of lenses.

In addition, the present precursor composition may comprise one or more initiators. Thermal initiators can be understood to have "kick-off" temperatures. By selecting a thermal initiator with a higher kick-off temperature, and using a relatively low amount of the initiator, it is possible to reduce the ionoflux of the present lenses and influence the amount of the removable component described herein. For example, one thermal initiator used in the present precursor compositions is 2,2'-azobis(2,4-dimethylpentanenitrile) (VAZO-52), which has a kick-off temperature of about 50° C. at which point the reactive components begin to polymerize. A second thermal initiator used in the present precursor compositions is Azobis-isobutyronitrile (VAZO-88), which has a kick-off temperature of about 90° C. Ophthalmically compatible silicone hydrogel contact lenses can be obtained from precursor compositions that comprise about 0.2 parts of VAZO-52, or about 0.1 parts of VAZO-88. In addition, the curing methods disclosed herein to polymerize the polymerizable composition can include one or more temperature steps.

Embodiments of the present precursor compositions can include one or more removable or extractable hydrophobic or amphiphilic additives, such as the specific additives described above. One or more of the additives can be present in an amount from about 1% to about 60% (w/w). In some embodiments, one or more of the additives is present in an amount from about 30% (w/w) to about 60% (w/w). In certain compositions, at least two different additives are provided.

Certain embodiments of the present precursor compositions include polymerizable silicone hydrogel contact lens precursor compositions provided in non-polar resin contact lens molds. Other embodiments include such compositions in storage containers, such as bottles and the like, or in dispensing devices, such as manual or automated pipetting devices.

One example of the present precursor compositions comprises a polymerizable silicon-containing component that consists of the dimethacryloyl silicone-containing macromer, α-ω-Bis(methacryloyloxyethyl iminocarboxy ethyloxypropyl)-poly(dimethylsiloxane)-poly (trifluoropropylmethylsiloxane)-poly(ω-methoxy-poly(ethyleneglycol)propylmethylsiloxane) (M3U), and a polymerizable non-siliconcontaining component that comprises N-vinyl-N-methylacetamide (VMA), isobornyl methacrylate (IBM), ethoxyethyl methacrylate (EOEMA), tri(ethylene glycol) dimethacrylate (TEGDMA), triethyleneglycol divinyl ether (TEGDVE), and 2,2'-azobis(2,4-dimethylpentanenitrile) (VAZO-52). IBM in this composition appears to increase the rigidity of the extracted silicone hydrogel contact lens compared to substantially identical lens without IBM. The silicon-containing component may comprise about 30-40% (w/w) of the composition, and the non-silicon-containing component may comprise about 60-70% (w/w) of the composition. In certain embodiments, the M3U is provided in an amount from about 30-40%, VMA is provided in an amount from about 45-50%, MMA is provided in an amount from about 15-20%, IBM is provided in an amount of about 5%, EOEMA is provided in an amount of 15%, TEGDMA or TEGDMA and TEGDVE are provided in amounts of about 0.2%, and VAZO-52 is provided in an amount of about 0.5%.

Another example of the present precursor compositions includes the foregoing components and an ultraviolet absorber and a tinting agent, which may be a reactive dye or pigment particles. The UV absorber can be provided in an amount of about 0.9%, and the tinting agent can be provided in an amount of about 0.1%. The UW absorbers can be strong UW absorbers that exhibit relatively high absorption values in the UV-A range of about 320-380 nm, but are relatively transparent above about 380 nm. For example, UW absorbers can include photopolymerizable hydroxybenzophenones and photopolymerizable benzotriazoles, such as 2-hydroxy-4-acryloyloxyethoxy benzophenone commercially available as CYASORBR UV416 from Cytec Industries, 2-hydroxy-4-(2 hydroxy-3-methacrylyloxy)propoxybenzophenone, and photopolymerizable benzotriazoles commercially available as NORBLOC® 7966 from Noramco. Other photopolymerizable UW absorbers can include polymerizable, ethylenically unsaturated triazines, salicylates, aryl-substituted acrylates and polymerizable versions of other effective UW absorbers, and mixtures of these UW absorbers.

Another embodiment of the present precursor compositions comprises a polymerizable silicon-containing component that consists of M3U, and a polymerizable non-silicon-containing component that comprises VMA, methyl methacrylate (MMA), TEGDMA, and VAZO-52.

An additional example of the present precursor compositions includes the components of the preceding embodiment and an ultraviolet absorber and a tinting agent. This embodiment may also include a block copolymer of polydimethylsiloxane (PDMS) and polyethylene glycol (PEG). The block copolymer is abbreviated herein as PDMS-co-PEG. One example of PDMS-co-PEG has a PEG content of 75%, and a molecular weight of about 1400. Other examples of useful PDMS-co-PEG materials have molecular weights from about 300 to about 3000 daltons. The PDMS-co-PEG can be present in an amount from about 10% (w/w) to about 40% (w/w). For example, a precursor composition may comprise PDMS-co-PEG in an amount of 12% (w/w), 20% (w/w), 25% (w/w), 29% (w/w), or 30% (w/w).

Another embodiment of the present precursor compositions comprises a polymerizable silicon-containing component that consists of M3U, and a polymerizable non-silicon-containing component that comprises VMA, IBM, MMA, TEGDMA, an ultraviolet absorber, a tinting agent, and VAZO-64. Embodiments of these compositions may have moduli greater than the other embodiments disclosed herein.

Another embodiment of the present precursor compositions comprises a polymerizable silicon-containing component that consists of M3U, and a polymerizable non-silicon-containing component that comprises 1-vinyl-2-pyrrolidone (NVP), MMA, TEGDMA, and VAZO-52. In such embodiments, the silicon-containing component comprises about 30-40% (w/w) of the compositions, and the non-silicon containing component comprises about 60-70% (w/w) of the compositions. For example, M3U may be present in amounts from about 35% to about 38%. NVP may be present in amounts of about 45-50%, MMA may be present in amounts of about 15-20%, TEGDMA may be present in amounts of about 0.1-0.8%, and VAZO-52 may be present in amounts of about 0.1-0.6%.

Another embodiment includes the previously identified components and decanol. The decanol can be provided in an amount from about 5% (w/w) to about 30% (w/w). For example, embodiments may comprise decanol in an amount of about 5% (w/w), about 10% (w/w), about 15% (w/w), about 20% (w/w), about 25% (w/w), or about 30% (w/w). Decanol can be effective both as a compatibilizer and a diluent. Thus, decanol can help reduce phase separation of the components of the lens precursor composition. One specific example of a decanol-containing formulation includes 35% M3U, from about 45% to about 55% of NVP, from about 13% to about 20% of MMA, about 0.1% TEGDMA, about 0.6% (VAZO-52), and about 30% decanol or lower.

The present NVP-containing precursor compositions may also comprise a demolding aid, such as a demolding aid that comprises a hydrophilic silicone component, a polyalkylene oxide component, or a combination thereof.

The present NVP-containing precursor compositions may also comprise a diluent selected from the group consisting of hexanol, ethoxyethanol, isopropanol (IPA), propanol, decanol, silicone oils, and combinations thereof. Diluents can be present in amounts from about 10% to about 30% (w/w). Compositions having relatively higher concentrations of diluents appear to have lower ionoflux values, reduced modulus, increased elongation, and water BUTs greater than 20 seconds.

Certain embodiments of the diluent containing NVP-containing precursor compositions comprise units of a methacrylate phosphorylcholine-monomer, such as 2-methacryloyloxyethyl phosphorylcholine. MPC can be present in amounts from about 1% (w/w) to about 15% (w/w) of the composition. For example, ophthalmically compatible silicone hydrogel contact lenses can be produced when the present compositions comprise about 2.5% MPC, about 5% MPC, about 7% MPC, about 10% MPC, or about 12% MPC. Such compositions may also include alcohol-based diluents. For example, some compositions may include about 5% decanol.

Embodiments of the present NVP-containing compositions, including the embodiments described above, also include (3-methacryloxy-2-hydroxypropyloxy)propylbis(trimethylsiloxy)methylsilane (SiGMA).

Another aspect of the present invention relates to methods of producing a silicone hydrogel contact lens.

In certain embodiments, the present methods include forming a silicone hydrogel contact lens body having a dry weight no greater than 90% of the dry weight of the lens body prior to extraction and an ophthalmically acceptable surface wettability from a pre-extracted silicone hydrogel contact lens product having a removable component content of at least 10% (w/w) of the lens product.

The forming step of such methods can comprise a step of extracting extractables from the pre-extracted silicone hydrogel contact lens product.

The methods may also comprise curing a polymerizable silicone hydrogel contact lens precursor composition to form a pre-extracted polymerized silicone hydrogel contact lens product having a removable component content that is at least 10% (w/w) of the lens product. As discussed herein, the curing can be thermal curing or ultraviolet curing. The curing may occur in a non-polar resin contact lens mold, such as a polyolefin-based contact lens mold.

Methods may also comprise combining a polymerizable silicon-containing component and a polymerizable non-silicon containing component to form the polymerizable silicone hydrogel contact lens precursor composition. Embodiments of this method may also include a step of adding a removable additive to the polymerizable silicone hydrogel contact lens precursor composition. The additive can be added to the final monomer mixture, or it can be added to either the silicon-containing component or the non-silicon-containing component prior to mixing the two components. The additive can be any of the additives described herein, including combinations of such additives.

Methods may also include a step of adding an ultraviolet absorber, a tinting agent, and combinations thereof to the lens precursor composition. As can be appreciated from the foregoing description, the methods can be practiced to produce a silicone hydrogel contact lens without surface treating the lens, forming the lens with an IPN of a polymeric wetting agent, without using a polar resin mold, or combinations thereof.

In view of the disclosure herein, an embodiment of the present silicone hydrogel contact lenses can be understood to comprise a lens body that has undergone an extraction procedure to efficiently remove extractables from a polypropylene-molded, nitrogen-cured polymerized silicone hydrogel contact lens product formed from a polymerizable silicone hydrogel contact lens precursor composition having wettability enhancing monomers, compatibilizing amounts of one or more additives, and a high amount of extractables distributed throughout the composition and lens product. The lens body has an ophthalmically acceptable surface wettability.

Using the present compositions and methods, ophthalmically compatible silicone hydrogel contact lenses have been invented while avoiding problems associated with the use of polar resin molds, such as difficulty separating the mold halves upon polymerization; problems associated with elaborate and expensive post-polymerization procedures, such as plasma etching, irradiation, chemical modification; and problems associated with IPNs of polymeric wetting agents.

EXAMPLES

The following Examples illustrate certain aspects and advantages of the present invention, which should be understood not to be limited thereby.

The following well-known chemicals are referred to in the examples, and may be referred to by their abbreviations.
PP: propylpropylene
PEG: polyethylene glycol
IBM: isobornyl methacrylate VMA: N-vinyl-N-methylacetamide (freshly distilled under a vacuum)
M3U: M3-U; α-ω-Bis(methacryloyloxyethyl iminocarboxy ethyloxypropyl)-poly(dimethylsiloxane)-poly (trifluoropropylmethylsiloxane)-poly(ω-methoxy-poly(ethyleneglycol)propylmethylsiloxane); dimethacryloyl silicone-containing macromer M3U used in the following examples is represented by the following formula where n is 121, m is 7.6, h is 4.4, and the Mn=12,800, and the Mw=16,200.

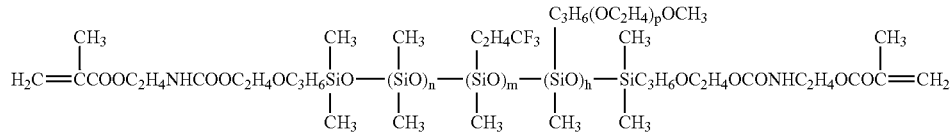

EOEMA: ethoxyethyl methacrylamide
Vazo-52: 2,2'-azobis(2,4-dimethylpentanenitrile) (V-52; thermal initiator)
Vazo-64: Azo-bis-isobutyronitrile (V-64; thermal initiator)
PDMS: polydimethylsiloxane
PDMS-co-PEG: block copolymer of polydimethylsiloxane and PEG containing 75% PEG and MW of 600 (DBE712 from Gelest)
HEMA: 2-hydroxyethyl methacrylate
NVP: 1-vinyl-2-pyrrolidone (freshly distilled under a vacuum)
HOB: 2-hydroxylbutyl methacrylate
FM0411M: FM-0411M; a-Methacryloyloxyethyl iminocarboxyethyloxypropyl-poly(dimethylsiloxy)-butyldimethylsilane FM0411M used in the following examples is represented by the following formula, where n=13-16, and the Mw is 1500.

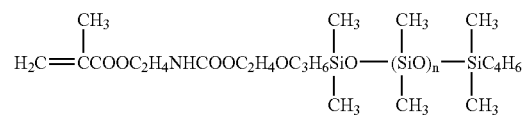

TAIC: 1,3,5-Triallyl-1,3,5-triazine-2,4,6(1H,3H,5H)-trione (Triallyl isocyanurate)
AOT: Aerosol OT; bis(2-ethylhexyl)sulfosuccinate sodium salt
TPO: Biphenyl (2,4,6-trimethylbenzoyl)phosphine oxide
IPA: Isopropyl alcohol
N,N-DMF: DMF; N,N-dimethylformamide
HMP: 4-hydroxy-4-methyl-2-pentanone
TEGDMA: triethylene glycol dimethacrylate
TEGDVE: triethylene glycol divinyl ether
MMA: methyl methacrylate
VM: vinyl methacrylate
PTA: Pentaerythritol triacrylate
TPTMA: Trimethylolpropane trimethacrylate
SiGMA: (3-methacryloxy-2-hydroxypropyloxy)propylbis(trimethylsiloxy)methylsilane
Pr: propanol
Hx: hexanol
DA: decanol
DVG: divinyl glycol
EE: ethoxyethanol
UV416: 2-(4-benzoyl-3-hydroxyphenoxy)ethyl acrylate M3U Tint: dispersion of beta Cu-phthalocyanine in M3U (% w/w). The Cu-phthalocyanine is available as Heliogen Blue K7090 from BASF.

Example 1

Silicone Hydrogel Contact Lens Fabrication

The chemical compounds set forth in Examples 2-55 were weighed and mixed to form a mixture. The mixture was filtered through a 0.2-5.0 micron syringe filter into a bottle. Mixtures were stored for up to about 2 weeks. The mixtures are understood to be polymerizable silicone hydrogel contact lens precursor compositions. In Examples 2-55, the unit amounts of each chemical compound are provided in addition to their respective weight percents (indicated as weight by weight; w/w). In the final silicone hydrogel contact lens, the weight percents of the chemical compounds more closely relate to the unit amounts present in the precursor compositions.

A volume of the precursor composition was placed in contact with a lens defining surface of a female non-polar resin mold member, such as a polypropylene mold member. A non-polar resin male mold member, such as a polypropylene male mold member, was placed in contact with the female mold member to form a contact lens mold comprising a contact lens shaped cavity containing the precursor composition.

Contact lens molds were placed in nitrogen flushed ovens to allow the precursor compositions to thermally cure. The contact lens molds were exposed to temperatures of about 80° C. for about 1 hour or more.

After polymerizing the precursor compositions, the contact lens molds were demolded and the pre-extracted polymerized silicone hydrogel contact lens product was delensed from one of the mold members. The pre-extracted delensed lens product was weighed to determine its dry weight.

The delensed lens product was then extracted and hydrated by contacting the lens product with multiple volumes of alcohol, such as ethanol, and deionized water. Hydrated silicone hydrogel contact lenses were weighed, and then dehydrated in an oven and weighed again to determine the dry weight of the dehydrated silicone hydrogel contact lens.

Properties such as contact angles, including dynamic and static contact angles, oxygen permeability, ionoflux, modulus, elongation, tensile strength, water content, and the like were determined, as described herein. Wettability of the hydrated silicone hydrogel contact lenses was also examined by measuring the water break up time for the lenses. Ophthalmic compatibility was further examined during dispensing studies in which the contact lens would be placed on an eye of person for 1 hour, 3 hours, or 6 hours or more, and clinical assessments were made.

Example 2

A polymerizable silicone hydrogel contact lens precursor composition was obtained by mixing and filtering the following chemical compounds in the specified amounts, and as described in Example 1.

| Chemical Compound (Abbrev.) | Unit amount | Wt % (w/w) |
|---|---|---|
| M3U | 35 | 34.6 |
| NVP | 45 | 44.5 |
| MMA | 20 | 19.8 |
| TEGDMA | 0.5 | 0.5 |
| V-52 | 0.6 | 0.6 |

Silicone hydrogel contact lenses obtained from this formulation were relatively easy to process and had acceptable compatibility. These contact lenses had an equilibrium water content of about 54%, a water BUT greater than 20 seconds, a static contact angle of about 48°, an ionoflux of about 3.8, a Young's modulus of about 0.5 MPa, and an elongation of about 227%. These silicone hydrogel contact lenses had an extractable amount of 16.9+/−0.3%.

Example 3

A polymerizable silicone hydrogel contact lens precursor composition was obtained by mixing and filtering the following chemical compounds in the specified amounts, and as described in Example 1.

| Chemical Compound (Abbrev.) | Unit amount | Wt % (w/w) |
|---|---|---|
| M3U | 35 | 34.6 |
| NVP | 50 | 49.5 |
| MMA | 15 | 14.9 |
| TEGDMA | 0.8 | 0.8 |
| V-52 | 0.2 | 0.2 |

Silicone hydrogel contact lenses obtained from this formulation were relatively easy to process and had acceptable compatibility. These contact lenses had an equilibrium water content of about 54%, a water BUT greater than 30 seconds, a static contact angle of about 34°, an advancing contact angle of 78°, a receding contact angle of 48°, an ionoflux of about 6, a Young's modulus of about 0.7 MPa, and an elongation of about 186%. These silicone hydrogel contact lenses had an extractable amount of 17.5+/−0.5%.

Example 4

A polymerizable silicone hydrogel contact lens precursor composition was obtained by mixing and filtering the following chemical compounds in the specified amounts, and as described in Example 1.

| Chemical Compound (Abbrev.) | Unit amount | Wt % (w/w) |
|---|---|---|
| M3U | 35 | 33.0 |
| NVP | 47 | 44.3 |
| MMA | 18 | 17.0 |
| TEGDMA | 0.5 | 0.5 |
| V-52 | 0.6 | 0.6 |
| DA | 5 | 5.7 |

Silicone hydrogel contact lenses obtained from this formulation were relatively easy to process and were compatible with mPC. These contact lenses had an equilibrium water content of about 52%, a water BUT greater than 18 seconds, a static contact angle of about 36°, an advancing contact angle of 76°, a receding contact angle of 49°, an ionoflux of about 6, a Young's modulus of about 0.7 MPa, and an elongation of about 167%.

Example 5

A polymerizable silicone hydrogel contact lens precursor composition was obtained by mixing and filtering the following chemical compounds in the specified amounts, and as described in Example 1.

| Chemical Compound (Abbrev.) | Unit amount | Wt % (w/w) |
|---|---|---|
| M3U | 35 | 30.8 |
| NVP | 47 | 41.4 |
| MMA | 18 | 15.9 |
| TEGDMA | 0.5 | 0.4 |
| V-52 | 0.5 | 0.4 |
| DA | 12.5 | 11.0 |

Silicone hydrogel contact lenses obtained from this formulation were relatively easy to process and were compatible with mPC. These contact lenses had an equilibrium water content of about 54%, a water BUT greater than 20 seconds, a static contact angle of about 37°, an advancing contact angle of 76°, a receding contact angle of 48°, an ionoflux of about 3.5, a Young's modulus of about 0.6 MPa, and an elongation of about 304%.

Example 6

A polymerizable silicone hydrogel contact lens precursor composition was obtained by mixing and filtering the following chemical compounds in the specified amounts, and as described in Example 1.

| Chemical Compound (Abbrev.) | Unit amount | Wt % (w/w) |
|---|---|---|
| M3U | 35 | 26.8 |
| NVP | 47 | 36.0 |
| MMA | 18 | 13.8 |
| TEGDMA | 0.1 | 0.01 |
| V-52 | 0.6 | 0.5 |
| DA | 25 | 19.1 |
| DBE | 5 | 3.8 |

Silicone hydrogel contact lenses obtained from this formulation showed acceptable demoldability and delensability. These contact lenses had an equilibrium water content of about 53%, a water BUT greater than 20 seconds, a static contact angle of about 34°, an ionoflux of about 5, a Young's modulus of about 0.4 MPa, and an elongation of about 197%.

Example 7

A polymerizable silicone hydrogel contact lens precursor composition was obtained by mixing and filtering the following chemical compounds in the specified amounts, and as described in Example 1.

| Chemical Compound (Abbrev.) | Unit amount | Wt % (w/w) |
|---|---|---|
| M3U | 35 | 26.6 |
| NVP | 47 | 35.7 |
| MMA | 18 | 13.7 |
| TEGDMA | 1 | 0.8 |
| V-52 | 0.6 | 0.5 |
| DA | 30 | 22.8 |

Silicone hydrogel contact lenses obtained from this formulation had a modulus from about 0.6 MPa to about 0.9 MPa.

Example 8

A polymerizable silicone hydrogel contact lens precursor composition was obtained by mixing and filtering the following chemical compounds in the specified amounts, and as described in Example 1.

| Chemical Compound (Abbrev.) | Unit amount | Wt % (w/w) |
|---|---|---|
| M3U | 35 | 26.8 |
| NVP | 47 | 36.0 |
| MMA | 18 | 13.8 |
| TEGDMA | 0.1 | 0.08 |
| V-52 | 0.6 | 0.5 |
| DA | 30 | 23.0 |

Silicone hydrogel contact lenses obtained from this formulation had ophthalmically acceptable surface wettabilities. These contact lenses had an equilibrium water content of about 52%, a water BUT greater than 20 seconds, a contact angle of about 42°, an advancing contact angle of about 73°, a receding contact angle of about 48°, an ionoflux of about 3.9, a Young's modulus of about 0.5 MPa, and an elongation of about 242%. These silicone hydrogel contact lenses had an extractable amount of 43.4+/−3.1%.

Example 9

A polymerizable silicone hydrogel contact lens precursor composition was obtained by mixing and filtering the following chemical compounds in the specified amounts, and as described in Example 1.

| Chemical Compound (Abbrev.) | Unit amount | Wt % (w/w) |
|---|---|---|
| M3U | 35 | 31.6 |
| NVP | 47 | 42.5 |
| MMA | 18 | 16.3 |
| TEGDMA | 0.1 | 0.1 |
| V-52 | 0.6 | 0.5 |
| IPA | 10 | 9.0 |

The pre-extracted polymerized silicone hydrogel contact lens products obtained from this formulation had an extractable component content of about 26%. Silicone hydrogel contact lenses obtained from this formulation had ophthalmically acceptable surface wettabilities.

Example 10

A polymerizable silicone hydrogel contact lens precursor composition was obtained by mixing and filtering the following chemical compounds in the specified amounts, and as described in Example 1.

| Chemical Compound (Abbrev.) | Unit amount | Wt % (w/w) |
|---|---|---|
| M3U | 35 | 26.8 |
| NVP | 47 | 36.0 |
| MMA | 18 | 13.8 |
| TEGDMA | 0.1 | 0.1 |

| Chemical Compound (Abbrev.) | Unit amount | Wt % (w/w) |
| --- | --- | --- |
| V-52 | 0.6 | 0.5 |
| IPA | 30 | 23.0 |

The pre-extracted polymerized silicone hydrogel contact lens products obtained from this formulation had an extractable component content of about 45%. Silicone hydrogel contact lenses obtained from this formulation had ophthalmically acceptable surface wettabilities. These contact lenses had an equilibrium water content of about 56%, a water BUT greater than 20 seconds, a contact angle of about 45°, an ionoflux of about 5.3, a Young's modulus of about 0.3 MPa, and an elongation of about 351%.

Example 11

A polymerizable silicone hydrogel contact lens precursor composition was obtained by mixing and filtering the following chemical compounds in the specified amounts, and as described in Example 1.

| Chemical Compound (Abbrev.) | Unit amount | Wt % (w/w) |
| --- | --- | --- |
| M3U | 35 | 26.8 |
| NVP | 47 | 36.0 |
| MMA | 18 | 13.8 |
| TEGDMA | 0.1 | 0.1 |
| V-52 | 0.6 | 0.5 |
| DA | 15 | 11.5 |
| DBE712 | 15 | 11.5 |

Silicone hydrogel contact lenses obtained from this formulation had ophthalmically acceptable surface wettabilities.

Example 12

A polymerizable silicone hydrogel contact lens precursor composition was obtained by mixing and filtering the following chemical compounds in the specified amounts, and as described in Example 1.

| Chemical Compound (Abbrev.) | Unit amount | Wt % (w/w) |
| --- | --- | --- |
| M3U | 35 | 26.8 |
| NVP | 47 | 36.0 |
| MMA | 18 | 13.8 |
| TEGDMA | 0.1 | 0.1 |
| V-52 | 0.6 | 0.5 |
| EE | 30 | 23.0 |

Silicone hydrogel contact lenses obtained from this formulation had ophthalmically acceptable surface wettabilities.

Example 13

A polymerizable silicone hydrogel contact lens precursor composition was obtained by mixing and filtering the following chemical compounds in the specified amounts, and as described in Example 1.

| Chemical Compound (Abbrev.) | Unit amount | Wt % (w/w) |
| --- | --- | --- |
| M3U | 35 | 26.8 |
| NVP | 47 | 36.0 |
| MMA | 18 | 13.8 |
| TEGDMA | 0.1 | 0.1 |
| V-52 | 0.6 | 0.5 |

The pre-extracted polymerized silicone hydrogel contact lens products obtained with this formulation had an extractable component content of about 17%.

Example 14

A polymerizable silicone hydrogel contact lens precursor composition was obtained by mixing and filtering the following chemical compounds in the specified amounts, and as described in Example 1.

| Chemical Compound (Abbrev.) | Unit amount | Wt % (w/w) |
| --- | --- | --- |
| M3U | 35 | 29.0 |
| NVP | 47 | 38.9 |
| MMA | 18 | 14.9 |
| TEGDMA | 0.1 | 0.1 |
| V-52 | 0.6 | 0.5 |
| IPA | 20 | 16.6 |

The pre-extracted polymerized silicone hydrogel contact lens products obtained from this formulation had an extractable component content of about 36%. Silicone hydrogel contact lenses obtained from this formulation had ophthalmically acceptable surface wettabilities.

Example 15

A polymerizable silicone hydrogel contact lens precursor composition was obtained by mixing and filtering the following chemical compounds in the specified amounts, and as described in Example 1.

| Chemical Compound (Abbrev.) | Unit amount | Wt % (w/w) |
| --- | --- | --- |
| M3U | 35 | 34.4 |
| NVP | 45 | 44.3 |
| MMA | 20 | 19.7 |
| TEGDMA | 1 | 1 |
| V-52 | 0.6 | 0.6 |

Silicone hydrogel contact lenses obtained from this formulation exhibited a water BUT greater than 20 seconds.

Example 16

A polymerizable silicone hydrogel contact lens precursor composition was obtained by mixing and filtering the following chemical compounds in the specified amounts, and as described in Example 1.

| Chemical Compound (Abbrev.) | Unit amount | Wt % (w/w) |
| --- | --- | --- |
| M3U | 35 | 34.4 |
| NVP | 45 | 44.3 |

| Chemical Compound (Abbrev.) | Unit amount | Wt % (w/w) |
| --- | --- | --- |
| MMA | 20 | 19.7 |
| DVG | 0.5 | 0.5 |
| TEGDMA | 0.5 | 0.5 |
| V-52 | 0.6 | 0.6 |

Silicone hydrogel contact lenses obtained from this formulation exhibited a water BUT less than 5 seconds.

Example 17

A polymerizable silicone hydrogel contact lens precursor composition was obtained by mixing and filtering the following chemical compounds in the specified amounts, and as described in Example 1.

| Chemical Compound (Abbrev.) | Unit amount | Wt % (w/w) |
| --- | --- | --- |
| M3U | 35 | 34.4 |
| NVP | 47 | 46.3 |
| MMA | 18 | 17.7 |
| DVG | 1 | 1 |
| V-64 | 0.6 | 0.6 |

Silicone hydrogel contact lenses obtained from this formulation exhibited a water BUT less than 5 seconds.

Example 18

A polymerizable silicone hydrogel contact lens precursor composition was obtained by mixing and filtering the following chemical compounds in the specified amounts, and as described in Example 1.

| Chemical Compound (Abbrev.) | Unit amount | Wt % (w/w) |
| --- | --- | --- |
| M3U | 35 | 30.1 |
| NVP | 47 | 40.4 |
| MMA | 18 | 15.5 |
| TEGDMA | 0.2 | 0.2 |
| V-64 | 0.6 | 0.5 |
| M3U Tint | 0.1 | 0.1 |
| UV416 | 0.9 | 0.8 |
| Hx | 15 | 12.9 |

Example 19

A polymerizable silicone hydrogel contact lens precursor composition was obtained by mixing and filtering the following chemical compounds in the specified amounts, and as described in Example 1.

| Chemical Compound (Abbrev.) | Unit amount | Wt % (w/w) |
| --- | --- | --- |
| M3U | 35 | 30.0 |
| NVP | 47 | 40.3 |
| MMA | 18 | 15.5 |
| TEGDMA | 0.4 | 0.3 |
| V-64 | 0.1 | 0.1 |
| M3U Tint | 0.1 | 0.1 |
| UV416 | 0.9 | 0.8 |
| EE | 15 | 12.9 |

Example 20

A polymerizable silicone hydrogel contact lens precursor composition was obtained by mixing and filtering the following chemical compounds in the specified amounts, and as described in Example 1.

| Chemical Compound (Abbrev.) | Unit amount | Wt % (w/w) |
| --- | --- | --- |
| M3U | 35 | 30.1 |
| NVP | 47 | 40.4 |
| MMA | 10 | 8.6 |
| IBM | 8 | 6.9 |
| TEGDMA | 0.1 | 0.1 |
| V-64 | 0.2 | 0.2 |
| M3U Tint | 0.1 | 0.1 |
| UV416 | 0.9 | 0.8 |
| EE | 15 | 12.9 |

Example 21

A polymerizable silicone hydrogel contact lens precursor composition was obtained by mixing and filtering the following chemical compounds in the specified amounts, and as described in Example 1.

| Chemical Compound (Abbrev.) | Unit amount | Wt % (w/w) |
| --- | --- | --- |
| M3U | 35 | 30.1 |
| NVP | 47 | 40.4 |
| MMA | 12 | 10.3 |
| IBM | 6 | 5.2 |
| TEGDMA | 0.1 | 0.1 |
| V-64 | 0.2 | 0.2 |
| M3U Tint | 0.1 | 0.1 |
| UV416 | 0.9 | 0.8 |
| EE | 15 | 12.9 |

Example 22

A polymerizable silicone hydrogel contact lens precursor composition was obtained by mixing and filtering the following chemical compounds in the specified amounts, and as described in Example 1.

| Chemical Compound (Abbrev.) | Unit amount | Wt % (w/w) |
| --- | --- | --- |
| M3U | 35 | 30.0 |
| NVP | 47 | 40.3 |
| MMA | 12 | 10.3 |
| IBM | 6 | 5.2 |
| TEGDMA | 0.3 | 0.3 |
| V-64 | 0.2 | 0.2 |
| M3U Tint | 0.1 | 0.1 |
| UV416 | 0.9 | 0.8 |
| EE | 15 | 12.9 |

Example 23

A polymerizable silicone hydrogel contact lens precursor composition was obtained by mixing and filtering the following chemical compounds in the specified amounts, and as described in Example 1.

| Chemical Compound (Abbrev.) | Unit amount | Wt % (w/w) |
|---|---|---|
| M3U | 35 | 23.2 |
| NVP | 52 | 34.5 |
| MMA | 8 | 5.3 |
| mPC | 5 | 3.3 |
| TEGDMA | 0.1 | 0.07 |
| V-52 | 0.6 | 0.3 |
| Pr | 5 | 3.3 |
| DA | 45 | 29.9 |

Silicone hydrogel contact lenses obtained from this formulation had ophthalmically acceptable surface wettabilities. These contact lenses had an equilibrium water content of about 63%, a water BUT greater than 19 seconds, a static contact angle of about 39°, an advancing contact angle of 93°, a receding contact angle of 46, a Young's modulus of about 0.4 MPa, an elongation of about 109%, and a tensile strength of about 0.2.

Example 24

A polymerizable silicone hydrogel contact lens precursor composition was obtained by mixing and filtering the following chemical compounds in the specified amounts, and as described in Example 1.

| Chemical Compound (Abbrev.) | Unit amount | Wt % (w/w) |
|---|---|---|
| M3U | 35 | 24.0 |
| NVP | 47 | 32.3 |
| MMA | 2 | 1.4 |
| DMA | 3 | 2.1 |
| mPC | 8 | 5.5 |
| TEGDMA | 0.1 | 0.07 |
| V-52 | 0.6 | 0.4 |
| Pr | 8 | 5.5 |
| DA | 42 | 28.8 |

Silicone hydrogel contact lenses obtained from this formulation had ophthalmically acceptable surface wettabilities.

Example 25

A polymerizable silicone hydrogel contact lens precursor composition was obtained by mixing and filtering the following chemical compounds in the specified amounts, and as described in Example 1.

| Chemical Compound (Abbrev.) | Unit amount | Wt % (w/w) |
|---|---|---|
| M3U | 27.8 | 18.8 |
| SIGMA | 16.4 | 11.1 |
| NVP | 47.2 | 32 |
| MMA | 1.7 | 1.2 |
| mPC | 7.7 | 5.2 |
| TEGDMA | 0.17 | 0.1 |
| V-52 | 0.46 | 0.3 |
| Pr | 7.7 | 5.2 |
| DA | 31.4 | 21.3 |
| ACN | 7 | 4.7 |

Silicone hydrogel contact lenses obtained from this formulation had ophthalmically acceptable surface wettabilities.

Example 26

A polymerizable silicone hydrogel contact lens precursor composition was obtained by mixing and filtering the following chemical compounds in the specified amounts, and as described in Example 1.

| Chemical Compound (Abbrev.) | Unit amount | Wt % (w/w) |
|---|---|---|
| M3U | 23 | 15.9 |
| SIGMA | 15 | 10.4 |
| NVP | 52 | 35.9 |
| MMA | 2 | 1.4 |
| mPC | 10 | 6.9 |
| TEGDMA | 0.2 | 0.1 |
| V-52 | 0.6 | 0.4 |
| DA | 22 | 15.2 |
| Hx | 10 | 6.9 |
| Pr | 10 | 6.9 |

Silicone hydrogel contact lenses obtained from this formulation had ophthalmically acceptable surface wettabilities.

Example 27

A polymerizable silicone hydrogel contact lens precursor composition was obtained by mixing and filtering the following chemical compounds in the specified amounts, and as described in Example 1.

| Chemical Compound (Abbrev.) | Unit amount | Wt % (w/w) |
|---|---|---|
| M3U | 23 | 15.3 |
| SIGMA | 15 | 9.9 |
| NVP | 52 | 34.5 |
| mPC | 10 | 6.6 |
| TEGDMA | 0.2 | 0.1 |
| V-52 | 0.6 | 0.4 |
| Pr | 10 | 6.6 |
| Hx | 40 | 26.5 |

Silicone hydrogel contact lenses obtained from this formulation had ophthalmically acceptable surface wettabilities. These contact lenses had an equilibrium water content of about 63%, a water BUT greater than 25 seconds, an ionoflux of about 17, a static contact angle of about 43°, an advancing contact angle of 94°, a receding contact angle of 48°, a Young's modulus of about 0.3 MPa, an elongation of about 166%, and a tensile strength of about 0.3.

Example 28

A polymerizable silicone hydrogel contact lens precursor composition was obtained by mixing and filtering the following chemical compounds in the specified amounts, and as described in Example 1.

| Chemical Compound (Abbrev.) | Unit amount | Wt % (w/w) |
|---|---|---|
| M3U | 25 | 16.6 |
| SIGMA | 13 | 8.6 |
| NVP | 47 | 31.2 |
| mPC | 15 | 9.9 |
| TEGDMA | 0.2 | 0.1 |
| V-52 | 0.6 | 0.4 |
| Pr | 15 | 9.9 |
| Hx | 35 | 23.2 |

Silicone hydrogel contact lenses obtained from this formulation had ophthalmically acceptable surface wettabilities.

Example 29

A polymerizable silicone hydrogel contact lens precursor composition was obtained by mixing and filtering the following chemical compounds in the specified amounts, and as described in Example 1.

| Chemical Compound (Abbrev.) | Unit amount | Wt % (w/w) |
|---|---|---|
| M3U | 30 | 23.0 |
| NVP | 52 | 39.8 |
| tBMA | 18 | 13.8 |
| EGDMA | 0.1 | 0.1 |
| TAIC | 0.2 | 0.2 |
| D1173 | 0.4 | 0.3 |
| DBE712 | 30 | 23.0 |

Silicone hydrogel contact lenses obtained from this formulation, which were cured with UV radiation, had ophthalmically acceptable surface wettabilities.

Example 30

A polymerizable silicone hydrogel contact lens precursor composition was obtained by mixing and filtering the following chemical compounds in the specified amounts, and as described in Example 1.

| Chemical Compound (Abbrev.) | Unit amount | Wt % (w/w) |
|---|---|---|
| M3U | 35 | 32.7 |
| NVP | 47 | 43.9 |
| MMA | 18 | 16.8 |
| mPC | 0.5 | 0.5 |
| TEGDMA | 0.5 | 0.5 |
| V-52 | 0.6 | 0.6 |
| Pr | 0.5 | 0.5 |
| DA | 5 | 4.7 |

Silicone hydrogel contact lenses obtained from this formulation had ophthalmically acceptable surface wettabilities.

Example 31

A polymerizable silicone hydrogel contact lens precursor composition was obtained by mixing and filtering the following chemical compounds in the specified amounts, and as described in Example 1.

| Chemical Compound (Abbrev.) | Unit amount | Wt % (w/w) |
|---|---|---|
| M3U | 35 | 26.3 |
| NVP | 47 | 35.3 |
| MMA | 18 | 13.5 |
| mPC | 1.25 | 0.9 |
| TEGDMA | 0.1 | 0.1 |
| V-52 | 0.6 | 0.5 |
| Pr | 1.25 | 0.9 |
| DA | 30 | 22.5 |

Silicone hydrogel contact lenses obtained from this formulation had ophthalmically acceptable surface wettabilities. These contact lenses had an equilibrium water content of about 54%, a water BUT greater than 17 seconds, a static contact angle of about 36°, an advancing contact angle of 87°, a receding contact angle of 44°, an ionoflux of about 8, a Young's modulus of about 0.5 MPa, an elongation of about 335%, and a tensile strength of about 0.4.

Example 32

A polymerizable silicone hydrogel contact lens precursor composition was obtained by mixing and filtering the following chemical compounds in the specified amounts, and as described in Example 1.

| Chemical Compound (Abbrev.) | Unit amount | Wt % (w/w) |
|---|---|---|
| M3U | 35 | 23.2 |
| NVP | 55 | 36.5 |
| MMA | 2 | 1.3 |
| mPC | 8 | 5.3 |
| TEGDMA | 0.1 | 0.1 |
| V-52 | 0.6 | 0.4 |
| Pr | 8 | 5.3 |
| DA | 42 | 27.9 |

Silicone hydrogel contact lenses obtained from this formulation had ophthalmically acceptable surface wettabilities. These contact lenses had an equilibrium water content of about 66%, a water BUT greater than 17 seconds, a static contact angle of about 33°, an advancing contact angle of 81°, a receding contact angle of 45°, a Young's modulus of about 0.4 MPa, an elongation of about 131%, and a tensile strength of about 0.3.

Example 33

A polymerizable silicone hydrogel contact lens precursor composition was obtained by mixing and filtering the following chemical compounds in the specified amounts, and as described in Example 1.

| Chemical Compound (Abbrev.) | Unit amount | Wt % (w/w) |
|---|---|---|
| M3U | 23 | 16.3 |
| SIGMA | 15 | 10.7 |
| NVP | 52 | 36.9 |
| mPC | 10 | 7.1 |
| TEGDMA | 0.2 | 0.1 |
| V-52 | 0.6 | 0.4 |
| Pr | 10 | 7.1 |
| Hx | 30 | 21.3 |

Silicone hydrogel contact lenses obtained from this formulation had ophthalmically acceptable surface wettabilities. These contact lenses had an equilibrium water content of about 63%, a water BUT greater than 19 seconds, an ionoflux of about 18, a static contact angle of about 37°, an advancing contact angle of 101°, a receding contact angle of 46°, a Young's modulus of about 0.4 MPa, an elongation of about 155%, and a tensile strength of about 0.4.

Example 34

A polymerizable silicone hydrogel contact lens precursor composition was obtained by mixing and filtering the following chemical compounds in the specified amounts, and as described in Example 1.

| Chemical Compound (Abbrev.) | Unit amount | Wt % (w/w) |
|---|---|---|
| M3U | 35 | 26.6 |
| NVP | 47 | 35.7 |
| MMA | 18 | 13.7 |
| TEGDMA | 0.1 | 0.1 |
| V-52 | 0.6 | 0.5 |
| Tint | 0.1 | 0.1 |
| UV | 0.9 | 0.7 |
| DBE-712 | 30 | 22.8 |

Silicone hydrogel contact lenses obtained from this formulation had ophthalmically acceptable surface wettabilities. The amount of extractables present in the polymerized lens products was greater than 10% and is estimated to be about 40 to 42%.

Example 35

A polymerizable silicone hydrogel contact lens precursor composition was obtained by mixing and filtering the following chemical compounds in the specified amounts, and as described in Example 1.

| Chemical Compound (Abbrev.) | Unit amount | Wt % (w/w) |
|---|---|---|
| M3U | 35 | 27.8 |
| NVP | 47 | 37.4 |
| MMA | 17 | 13.5 |
| TEGDMA | 0.2 | 0.2 |
| V-52 | 0.5 | 0.4 |
| Tint | 0.1 | 0.1 |
| UV | 0.9 | 0.7 |
| DBE-712 | 25 | 19.9 |

Silicone hydrogel contact lenses obtained from this formulation had ophthalmically acceptable surface wettabilities. The amount of extractables present in the polymerized lens products was greater than 10% and is estimated to be about 40 to 42%.

Example 36

A polymerizable silicone hydrogel contact lens precursor composition was obtained by mixing and filtering the following chemical compounds in the specified amounts, and as described in Example 1.

| Chemical Compound (Abbrev.) | Unit amount | Wt % (w/w) |
|---|---|---|
| M3U | 35 | 34.8 |
| VMA | 45 | 44.7 |
| IBM | 5 | 5.0 |
| EOEMA | 15 | 14.9 |
| x-MIX3 | 0.2 | .2 |
| V-52 | 0.5 | 0.5 |

Silicone hydrogel contact lenses obtained from this formulation had ophthalmically acceptable surface wettabilities. These silicone hydrogel contact lenses had equilibrium water concentrations of 61.3+/−0.05%, and had an extractable amount of 17.5+/−0.5%.

Example 37

A polymerizable silicone hydrogel contact lens precursor composition was obtained by mixing and filtering the following chemical compounds in the specified amounts, and as described in Example 1.

| Chemical Compound (Abbrev.) | Unit amount | Wt % (w/w) |
|---|---|---|
| M3U | 35 | 34.8 |
| VMA | 45 | 44.7 |
| IBM | 5 | 5.0 |
| EOEMA | 14 | 13.9 |
| x-MIX3 | 0.2 | .2 |
| V-52 | 0.5 | 0.5 |
| UV416 | 0.9 | 0.9 |
| TINT | 0.1 | 0.1 |

Silicone hydrogel contact lenses obtained from this formulation had ophthalmically acceptable surface wettabilities. These silicone hydrogel contact lenses had equilibrium water concentrations of 61.3+/−0.05%, and had an extractable amount of 17.5+/−0.5%.

Example 38

A polymerizable silicone hydrogel contact lens precursor composition was obtained by mixing and filtering the following chemical compounds in the specified amounts, and as described in Example 1.

| Chemical Compound (Abbrev.) | Unit amount | Wt % (w/w) |
|---|---|---|
| M3U | 35 | 34.8 |
| VMA | 47 | 46.7 |
| MMA | 18 | 17.9 |
| TEGDMA | 0.2 | 0.2 |
| V-52 | 0.5 | 0.5 |

Silicone hydrogel contact lenses obtained from this formulation had ophthalmically acceptable surface wettabilities. These silicone hydrogel contact lenses had equilibrium water concentrations of 54.6+/−1.27%, and had an extractable amount of 23.6+/−0.1%.

Example 39

A polymerizable silicone hydrogel contact lens precursor composition was obtained by mixing and filtering the following chemical compounds in the specified amounts, and as described in Example 1.

| Chemical Compound (Abbrev.) | Unit amount | Wt % (w/w) |
| --- | --- | --- |
| M3U | 35 | 34.8 |
| VMA | 47 | 46.7 |
| MMA | 17 | 16.9 |
| TEGDMA | 0.2 | 0.2 |
| V-52 | 0.5 | 0.5 |
| UV416 | 0.9 | 0.9 |
| TINT | 0.1 | 0.1 |

Silicone hydrogel contact lenses obtained from this formulation had ophthalmically acceptable surface wettabilities. These contact lenses had an equilibrium water content of about 55%, an ionoflux of about 7, a static contact angle of about 34°, an advancing contact angle of about 65°, a receding contact angle of 50°, a Young's modulus of about 0.6 MPa, an elongation of about 238%, and a Dk of about 109. These silicone hydrogel contact lenses had an extractable amount of 23.6+/−0.1%.

Example 40

A polymerizable silicone hydrogel contact lens precursor composition was obtained by mixing and filtering the following chemical compounds in the specified amounts, and as described in Example 1.

| Chemical Compound (Abbrev.) | Unit amount | Wt % (w/w) |
| --- | --- | --- |
| M3U | 35 | 27.8 |
| VMA | 47 | 37.4 |
| MMA | 17 | 13.5 |
| TEGDMA | 0.2 | 0.2 |
| V-52 | 0.5 | 0.4 |
| UV416 | 0.9 | 0.7 |
| TINT | 0.1 | 0.1 |
| DBE712 | 25 | 19.9 |

Silicone hydrogel contact lenses obtained from this formulation had ophthalmically acceptable surface wettabilities. These silicone hydrogel contact lenses had equilibrium water concentrations of 47.6+/−0.5%, and had an extractable amount of 48.9+/−0.7%.

Example 41

A polymerizable silicone hydrogel contact lens precursor composition was obtained by mixing and filtering the following chemical compounds in the specified amounts, and as described in Example 1.

| Chemical Compound (Abbrev.) | Unit amount | Wt % (w/w) |
| --- | --- | --- |
| M3U | 35 | 29.0 |
| VMA | 47 | 38.9 |
| MMA | 17 | 14.1 |
| TEGDMA | 0.2 | 0.2 |
| V-52 | 0.5 | 0.4 |
| UV416 | 0.9 | 0.7 |
| TINT | 0.1 | 0.1 |
| DBE712 | 20 | 16.6 |

Silicone hydrogel contact lenses obtained from this formulation had ophthalmically acceptable surface wettabilities. These contact lenses had an equilibrium water content of about 55%, an ionoflux of about 6, a static contact angle of about 35°, an advancing contact angle of about 73°, a receding contact angle of 49°, a Young's modulus of about 0.3 MPa, an elongation of about 265%, and a Dk of about 98.

Example 42

A polymerizable silicone hydrogel contact lens precursor composition was obtained by mixing and filtering the following chemical compounds in the specified amounts, and as described in Example 1.

| Chemical Compound (Abbrev.) | Unit amount | Wt % (w/w) |
| --- | --- | --- |
| M3U | 35 | 27.0 |
| VMA | 47 | 36.2 |
| MMA | 17 | 13.1 |
| TEGDMA | 0.2 | 0.2 |
| V-52 | 0.5 | 0.4 |
| UV416 | 0.9 | 0.7 |
| TINT | 0.1 | 0.1 |
| DBE712 | 29 | 22.4 |

Silicone hydrogel contact lenses obtained from this formulation had ophthalmically acceptable surface wettabilities. These contact lenses had an equilibrium water content of about 46%, an ionoflux of about 4, a static contact angle of about 40°, an advancing contact angle of about 78°, a receding contact angle of about 54°, a Young's modulus of about 0.4 MPa, an elongation of about 219%, and a Dk of about 129. These silicone hydrogel contact lenses had an extractable amount of 50.2+/−0.8%.

Example 43

A polymerizable silicone hydrogel contact lens precursor composition was obtained by mixing and filtering the following chemical compounds in the specified amounts, and as described in Example 1.

| Chemical Compound (Abbrev.) | Unit amount | Wt % (w/w) |
| --- | --- | --- |
| M3U | 35 | 31.1 |
| VMA | 47 | 41.7 |
| MMA | 17 | 15.1 |
| TEGDMA | 0.2 | 0.2 |
| V-52 | 0.5 | 0.4 |
| UV416 | 0.9 | 0.8 |
| TINT | 0.1 | 0.1 |
| DBE712 | 12 | 10.6 |

Silicone hydrogel contact lenses obtained from this formulation had ophthalmically acceptable surface wettabilities.

Example 44

A polymerizable silicone hydrogel contact lens precursor composition was obtained by mixing and filtering the following chemical compounds in the specified amounts, and as described in Example 1.

| Chemical Compound (Abbrev.) | Unit amount | Wt % (w/w) |
| --- | --- | --- |
| M3U | 35 | 34.8 |
| VMA | 45 | 41.5 |
| IBM | 8 | 8.0 |

-continued

| Chemical Compound (Abbrev.) | Unit amount | Wt % (w/w) |
|---|---|---|
| MMA | 11 | 10.9 |
| TEGDMA | 0.2 | 0.2 |
| V-64 | 0.3 | 0.3 |
| UV416 | 0.9 | 0.9 |
| TINT | 0.1 | 0.1 |

Silicone hydrogel contact lenses obtained from this formulation had ophthalmically acceptable surface wettabilities.

Example 45

A polymerizable silicone hydrogel contact lens precursor composition was obtained by mixing and filtering the following chemical compounds in the specified amounts, and as described in Example 1.

| Chemical Compound (Abbrev.) | Unit amount | Wt % (w/w) |
|---|---|---|
| M3U | 35 | 34.8 |
| VMA | 47 | 46.8 |
| IBM | 6 | 6.0 |
| MMA | 11 | 10.9 |
| TEGDMA | 0.2 | 0.2 |
| V-64 | 0.3 | 0.3 |
| UV416 | 0.9 | 0.9 |
| TINT | 0.1 | 0.1 |

Silicone hydrogel contact lenses obtained from this formulation had ophthalmically acceptable surface wettabilities.

Example 46

A polymerizable silicone hydrogel contact lens precursor composition was obtained by mixing and filtering the following chemical compounds in the specified amounts, and as described in Example 1.

| Chemical Compound (Abbrev.) | Unit amount | Wt % (w/w) |
|---|---|---|
| M3U | 35 | 34.8 |
| VMA | 45 | 44.7 |
| IBM | 6 | 6.0 |
| MMA | 13 | 12.9 |
| TEGDMA | 0.2 | 0.2 |
| V-64 | 0.4 | 0.4 |
| UV416 | 0.9 | 0.9 |
| TINT | 0.1 | 0.1 |

Silicone hydrogel contact lenses obtained from this formulation had ophthalmically acceptable surface wettabilities.

Example 47

A polymerizable silicone hydrogel contact lens precursor composition was obtained by mixing and filtering the following chemical compounds in the specified amounts, and as described in Example 1.

| Chemical Compound (Abbrev.) | Unit amount | Wt % (w/w) |
|---|---|---|
| M3U | 27 | 20.0 |
| FMM | 10 | 7.4 |

-continued

| Chemical Compound (Abbrev.) | Unit amount | Wt % (w/w) |
|---|---|---|
| NVP | 46 | 34.1 |
| PC | 6 | 4.4 |
| IBM | 6 | 4.4 |
| HOP | 4 | 3.0 |
| Mix4 | 0.4 | 0.3 |
| V-52 | 0.5 | 0.4 |
| Pr | 35 | 25.9 |

Silicone hydrogel contact lenses obtained from this formulation had ophthalmically acceptable surface wettabilities. These contact lenses had an equilibrium water content of about 60%, an ionoflux of about 11, a static contact angle of about 46°, an advancing contact angle of about 102°, a receding contact angle of about 51°, a Young's modulus of about 0.2 MPa, an elongation of about 150%, and a tensile strength of about 0.2.

Example 48

A polymerizable silicone hydrogel contact lens precursor composition was obtained by mixing and filtering the following chemical compounds in the specified amounts, and as described in Example 1.

| Chemical Compound (Abbrev.) | Unit amount | Wt % (w/w) |
|---|---|---|
| M3U | 23 | 16.4 |
| SIGMA | 15 | 10.7 |
| NVP | 45 | 32.2 |
| PC | 10 | 7.1 |
| IBM | 6 | 4.3 |
| Mix3 | 0.4 | 0.3 |
| V-52 | 0.5 | 0.4 |
| Pr | 40 | 28.6 |

Silicone hydrogel contact lenses obtained from this formulation had ophthalmically acceptable surface wettabilities. These contact lenses had an equilibrium water content of about 61%, an ionoflux of about 14, a static contact angle of about 40°, an advancing contact angle of about 106°, a receding contact angle of about 52°, a Young's modulus of about 0.2 MPa, an elongation of about 224%, a tensile strength of about 0.3, and a Dk of about 69.

Example 49

A polymerizable silicone hydrogel contact lens precursor composition was obtained by mixing and filtering the following chemical compounds in the specified amounts, and as described in Example 1.

| Chemical Compound (Abbrev.) | Unit amount | Wt % (w/w) |
|---|---|---|
| M3U | 35 | 30.3 |
| VMA | 45 | 39.0 |
| IBM | 8 | 6.9 |
| MMA | 11 | 9.5 |
| TEGDMA | 0.2 | 0.2 |
| V-64 | 0.3 | 0.3 |
| UV416 | 0.9 | 0.8 |
| TINT | 0.1 | 0.1 |
| DBE712 | 15 | 13.0 |

Silicone hydrogel contact lenses obtained from this formulation had ophthalmically acceptable surface wettabilities.

Example 50

A polymerizable silicone hydrogel contact lens precursor composition was obtained by mixing and filtering the following chemical compounds in the specified amounts, and as described in Example 1.

| Chemical Compound (Abbrev.) | Unit amount | Wt % (w/w) |
|---|---|---|
| M3U | 35 | 34.8 |
| NVP | 47 | 42.5 |
| MMA | 18 | 16.3 |
| TEGDMA | 0.1 | 0.1 |
| V-52 | 0.6 | 0.5 |
| HMP | 10 | 9.0 |

Example 51

A polymerizable silicone hydrogel contact lens precursor composition was obtained by mixing and filtering the following chemical compounds in the specified amounts, and as described in Example 1.

| Chemical Compound (Abbrev.) | Unit amount | Wt % (w/w) |
|---|---|---|
| M3U | 35 | 26.8 |
| NVP | 47 | 36.0 |
| MMA | 18 | 13.8 |
| TEGDMA | 0.1 | 0.1 |
| V-52 | 0.6 | 0.5 |
| HMP | 30 | 23.0 |

Example 52

A polymerizable silicone hydrogel contact lens precursor composition was obtained by mixing and filtering the following chemical compounds in the specified amounts, and as described in Example 1.

| Chemical Compound (Abbrev.) | Unit amount | Wt % (w/w) |
|---|---|---|
| M3U | 35 | 0.24 |
| NVP | 47 | 32.3 |
| MMA | 2 | 1.4 |
| DMA | 3 | 2.1 |
| mPC | 8 | 5.5 |
| TEGDMA | 0.1 | 0.1 |
| V-52 | 0.6 | 0.4 |
| Pr | 50 | 34.3 |

Example 53

A polymerizable silicone hydrogel contact lens precursor composition was obtained by mixing and filtering the following chemical compounds in the specified amounts, and as described in Example 1.

| Chemical Compound (Abbrev.) | Unit amount | Wt % (w/w) |
|---|---|---|
| M3U | 27.88 | 18.9 |
| SIGMA | 16.4 | 11.1 |
| NVP | 47.2 | 32.0 |
| MMA | 1.7 | 1.2 |
| mPC | 7.7 | 5.2 |
| TEGDMA | 0.17 | 0.1 |
| V-52 | 0.46 | 0.3 |
| DA | 31.4 | 21.3 |
| Pr | 7.7 | 5.2 |
| DMSO | 7 | 4.7 |

Example 54

A polymerizable silicone hydrogel contact lens precursor composition was obtained by mixing and filtering the following chemical compounds in the specified amounts, and as described in Example 1.

| Chemical Compound (Abbrev.) | Unit amount | Wt % (w/w) |
|---|---|---|
| M3U | 20 | 14.2 |
| TRIS | 15 | 10.7 |
| VMA | 30 | 21.3 |
| mPC | 4 | 2.8 |
| HEMA | 10 | 7.1 |
| MMA | 10 | 7.1 |
| DMA | 15 | 10.7 |
| TEGDMA | 0.1 | 0.1 |
| V52 | 0.6 | 0.4 |
| Pr | 6 | 4.3 |
| DA | 30 | 21.3 |

Example 55

A polymerizable silicone hydrogel contact lens precursor composition was obtained by mixing and filtering the following chemical compounds in the specified amounts, and as described in Example 1.

| Chemical Compound (Abbrev.) | Unit amount | Wt % (w/w) |
|---|---|---|
| M3U | 25 | 16.6 |
| SiGMA | 13 | 8.6 |
| NVP | 47 | 31.2 |
| mPC | 15 | 9.9 |
| TEGDMA | 0.2 | 0.1 |
| V52 | 0.6 | 0.4 |
| Pr | 15 | 9.9 |
| DA | 35 | 23.2 |

Example 56

A polymerizable silicone hydrogel contact lens precursor composition was obtained by mixing and filtering the following chemical compounds in the specified amounts, and as described in Example 1.

| Chemical Compound (Abbrev.) | Unit amount | Wt % (w/w) |
|---|---|---|
| M3U | 25 | 16.6 |
| SiGMA | 8 | 5.3 |
| NVP | 52 | 34.5 |
| mPC | 15 | 9.9 |
| TEGDMA | 0.2 | 0.1 |
| V52 | 0.6 | 0.4 |
| Pr | 15 | 9.9 |
| Hx | 35 | 23.2 |

Example 57

A polymerizable silicone hydrogel contact lens precursor composition was obtained by mixing and filtering the following chemical compounds in the specified amounts, and as described in Example 1.

| Chemical Compound (Abbrev.) | Unit amount | Wt % (w/w) |
|---|---|---|
| M3U | 30 | 23.0 |
| NVP | 52 | 39.8 |
| tBMA | 18 | 13.8 |
| EGDMA | 0.1 | 0.1 |
| TAIC | 0.2 | 0.2 |
| D1173 | 0.4 | 0.3 |
| DBE814 | 30 | 23.0 |

Example 58

Silicone hydrogel contact lenses were obtained from non-polar resin lens molds and were produced from lens precursor compositions obtained by mixing and filtering the following chemical compounds in the specified amounts, as described in Example 1.

| Code | R1 | R3 | R7 | R8 | R9 | R0 |
|---|---|---|---|---|---|---|
| M3U | 35 | 35 | 35 | 35 | 35 | 35 |
| VMA | 45 | 45 | 45 | 45 | 45 | 45 |
| IBM | 6.5 | 5 | 5 | 8 | 8 | 5 |
| EOEMA | 13.5 | 15 | 15 | 12 | 12 | 15 |
| TEGDMA | 0.2 | 0.6 | 0.2 | 0 | 0 | 0.1 |
| TEGDVE | 0.2 | 0 | 0 | 0.2 | 0.6 | 0.1 |
| V52 | 0.5 | 0.5 | 0.5 | 0.5 | 0.5 | 0.5 |

R1 lenses had an equilibrium water content of 63.1%, and exhibited a water BUT of 4.7 seconds after 24 hours, and 9 seconds after 4 days. The R1 lens products had an extractable content of about 16%.

R3 lenses had an equilibrium water content of 56%, and exhibited a water BUT of 18 seconds after 24 hours, and 20 seconds after 4 days. The R3 lens products had an extractable content of about 26%. R3 lenses had a contact angle of 34.1°, an advancing contact angle of 106.3°, a receding contact angle of 52.4°, a hysteresis of 53.9°, an ionoflux of $5.5\ 10^{-3}$ mm$^2$/min, a modulus of 0.42 MPa, an elongation of 135%, and a tensile strength of 0.27 MPa.

R7 lenses had an equilibrium water content of 60.8%, and exhibited a water BUT of 20 seconds after 24 hours, and 20 seconds after 4 days. The R7 lens products had an extractable content of about 25%. R7 lenses had a contact angle of 33.7°, an advancing contact angle of 103.7°, a receding contact angle of 53.9°, a hysteresis of 49.8°, an ionoflux of $8.1\ 10^{-3}$ mm$^2$/min, a modulus of 0.33 MPa, an elongation of 139%, and a tensile strength of 0.24 MPa.

R8 lenses had an equilibrium water content of 64.2%, and exhibited a water BUT of 4.3 seconds after 24 hours, and 9 seconds after 4 days. The R8 lens products had an extractable content of about 15%.

R9 lenses had an equilibrium water content of 63.9%, and exhibited a water BUT of 1.3 seconds after 24 hours, and 7 seconds after 4 days. The R9 lens products had an extractable content of about 13%.

R0 lenses had an equilibrium water content of 63.8%, and exhibited a water BUT of 15 seconds after 24 hours, and 20 seconds after 4 days. The R0 lens products had an extractable content of about 22%. R0 lenses had a contact angle of 38°, an advancing contact angle of 101.3°, a receding contact angle of 48.7°, a hysteresis of 52.6°, an ionoflux of $11.7\ 10^{-3}$ mm$^2$/min, a modulus of 0.42 MPa, an elongation of 191%, and a tensile strength of 0.35 MPa.

Example 59

The effects of different cross-linkers on extractable component content were also evaluated. Silicone hydrogel contact lenses were produced in non-polar resin lens molds without surface treatment and without a polymeric IPN. Ingredients of the lens formulations are provided in the following table. The cross-linker type and concentration were varied and the extractable component content was determined.

| Name | M3U | VMA | IBM | EOEMA | Cross-linker type | Cross-linker % | V-52 | EWC % | Extract % in EtOH |
|---|---|---|---|---|---|---|---|---|---|
| T31 | 35 | 45 | 5 | 15 | TAIC | 0.2 | 0.5 | 63.4 | 9.88 |
| T31A | 35 | 45 | 6 | 14 | TEGDVE | 0.3 | | 65 | 10.3 |
| T31B | 35 | 45 | 6 | 14 | VM | 0.3 | | 58.7 | 9.62 |
| T31C | 35 | 45 | 5 | 15 | TEGDMA | 0.2 | 0.5 | 54.06 | 25.85 |
| T31C1 | 35 | 45 | 5 | 15 | TEGDMA | 0.4 | 0.5 | 53.38 | 24.66 |
| T31C2 | 35 | 45 | 5 | 15 | TEGDMA | 0.8 | 0.5 | 51.58 | 24.14 |
| T31E | 35 | 45 | 5 | 15 | PTA | 0.2 | 0.5 | 53.5 | 25.13 |
| T31F | 35 | 45 | 5 | 15 | TPTMA | 0.2 | 0.5 | 53.36 | 25.72 |
| T31G | 35 | 45 | 5 | 15 | MIX#3 | 0.2 | 0.5 | 61.6 | 16.9 |

MIX#3: 1:1 ratio of TEGDMA and TEGDVE

These results demonstrate that silicone hydrogel contact lenses which comprise units derived from VMA and IBM and which utilized a di-methacrylate or tri-methacrylate-based cross-linker were obtained from silicone hydrogel contact lens products having high extractable component contents (e.g., greater than 16.9%). In comparison, lens products comprising units derived from VMA and IBM, and which utilized vinyl methacrylate, or triallyl isocyanurate cross-linkers had lower extractable component contents (e.g., less than 10%). Lens products that used triethylene glycol divinyl ether as a cross-linker had an extractable component content of 10.3%.

In this study. 80% of the contact lenses obtained with each of the formulation names T31A; T31C; T31C1; T31C2; T31E; T31F; and T31G exhibited water BUTs greater than 20 seconds. Of the T31 lenses, 60% exhibited a water BUT of 10 seconds. Of the T31B lenses, only 40% exhibited a water BUT of 5 seconds.

Thus, for these lens formulations, di-methacryate and tri-methacrylate based cross-linkers can consistently provide silicone hydrogel contact lens products with high extractable component contents. The silicone hydrogel contact lenses obtained from these lens products have desirable surface wettabilities.

These data also support the discovery that when these silicone hydrogel lens products have an extractable component content greater than 10%, or when the silicone hydrogel contact lenses obtained therefrom have a dry weight no greater than 90% of the dry weight of the respective lens products, silicone hydrogel contact lenses can have ophthalmically acceptable surface wettabilities.

Example 60

Examples of the present silicone hydrogel contact lenses were compared to existing silicone hydrogel contact lenses, as shown in the following table. Lens A is the Acuvue Advance contact lens (Johnson & Johnson); lens B is the Acuvue Oasys contact lens (Johnson & Johnson), lens C is the $O_2$ Optix contact lens (Ciba Vision); and lens D is the Biofinity contact lens (CooperVision).

lens precursor composition used in the manufacture of Biofinity silicone hydrogel contact lenses produces a pre-extracted polymerized silicone hydrogel contact lens product having an extractable amount less than 10% (w/w), such as about 8% (w/w). When the precursor composition was cured in a non-polar resin contact lens mold, and extracted and hydrated, the resulting silicone hydrogel contact lens had a lens body that had a dry weight of about 92% of the pre-extracted lens product. The hydrated contact lenses so produced had ophthalmically unacceptable surface wettabilities. In comparison, the present lenses comprise a lens body having a dry weight no greater than 90% of the dry weight of the pre-extracted polymerized silicone hydrogel contact lens product, and have ophthalmically acceptable surface wettabilities, as described above.

Although the disclosure herein refers to certain illustrated embodiments, it is to be understood that these embodiments are presented by way of example and not by way of limitation. The intent of the foregoing detailed description, although discussing exemplary embodiments, is to be construed to cover all modifications, alternatives, and equivalents of the embodiments as may fall within the spirit and scope of the invention as defined by the additional disclosure.

A number of publications and patents have been cited hereinabove. Each of the cited publications and patents are hereby incorporated by reference in their entireties.

What is claimed is:

1. A polymerizable silicone hydrogel contact lens precursor composition, comprising:
    a polymerizable non-silicon-containing component combined with a polymerizable silicon-containing component as a polymerizable silicone hydrogel contact lens precursor composition, a portion of the polymerizable silicone hydrogel contact lens precursor composition being removable from a polymerized silicone hydrogel contact lens product produced from the polymerizable silicone hydrogel contact lens precursor composition, and being present in an amount of at least 10% (w/w) of the polymerized silicone hydrogel contact lens product,

| Properties | Lens A | Lens B | Lens C | Lens D | Ex. 8 | Ex. 40 | Ex. 27 |
|---|---|---|---|---|---|---|---|
| EWC | 47 | 38 | 33 | 47 | 54 | 46 | 54 |
| Dk | 60 | 103 | 110 | 128 | 120 | 129 | 109 |
| Ionoflux | 3.5 | NA | 1.8 | 4.5 | 4.5 | 4.0 | 6.8 |
| Modulus | 0.37 | 0.73 | 0.97 | 0.75 | 0.4 | 0.35 | 0.56 |
| % Elong | 197 | 222 | 186 | 130 | 222 | 219 | 238 |
| ACA | 96 | 67 | 70 | 56 | 65 | 78 | 65 |
| RCA | 49 | 54 | 51 | 46 | 49 | 54 | 50 |
| Hysteresis | 47 | 13 | 19 | 10 | 16 | 24 | 15 |
| % Extractables in pre-extracted PSHCLP | NA | NA | NA | 8 | 16 | 25 | 25 |
| % Extractables in SHCL | 6.5 | 4.9 | 4.1 | 3.9 | 15 | 1.6 | 0 |

EWC: equilibrium water content (percent)
ACA: advancing contact angle (degrees)
RCA: receding contact angle (degrees)
PSHCLP: polymerized silicone hydrogel contact lens product
SHCL: silicone hydrogel contact lens (post-extraction and hydration)

Example 61

Examples of the present silicone hydrogel contact lenses were compared to silicone hydrogel contact lenses obtained from non-polar resin contact lens molds using lens precursor compositions of Biofinity silicone hydrogel contact lenses. A wherein said portion has unreacted monomer, partially reacted monomer, or both in an amount that is at least 10% (w/w) based on the weight of the polymerized silicone hydrogel contact lens product.

2. The polymerizable silicone hydrogel contact lens precursor composition of claim 1, wherein the polymerizable non-silicon-containing component comprises a first monomer having a first reactivity ratio, and a second monomer having a second reactivity ratio less than the first reactivity ratio.

3. The polymerizable silicone hydrogel contact lens precursor composition of claim 2, wherein the polymerizable non-silicon-containing component further comprises a crosslinking agent having a reactivity ratio similar to the first reactivity ratio.

4. The polymerizable silicone hydrogel contact lens precursor composition of claim 1, wherein the polymerizable silicon-containing component is α-ω-Bis(methacryloyloxyethyl iminocarboxy ethyloxypropyl)-poly(dimethylsiloxane)-poly (trifluoropropylmethylsiloxane)-poly(ω-methoxypoly(ethyleneglycol)propylmethylsiloxane); dimethacryloyl silicone-containing macromer, and the polymerizable non-silicon-containing component comprises N-vinyl-N-methylacetamide, methyl methacrylate, tri(ethylene glycol) dimethacrylate, and an initiator.

5. The polymerizable silicone hydrogel contact lens precursor composition of claim 4, wherein the non-silicon-containing component further comprises an ultraviolet absorber and a tinting agent.

6. The polymerizable silicone hydrogel contact lens precursor composition of claim 5, further comprising a block copolymer of polydimethylsiloxane and polyethylene glycol.

7. The polymerizable silicone hydrogel contact lens precursor composition of claim 1, wherein the polymerizable silicon-containing component is α-ω-Bis(methacryloyloxyethyl iminocarboxy ethyloxypropyl)-poly(dimethylsiloxane)-poly(trifluoropropylmethylsiloxane)-poly(ω-methoxypoly(ethyleneglycol)propylmethylsiloxane); dimethacryloyl silicone-containing macromer, and the polymerizable non-silicon-containing component comprises 1-vinyl-2-pyrrolidone, methyl methacrylate, tri(ethylene glycol)dimethacrylate, and an initiator.

8. The polymerizable silicone hydrogel contact lens precursor composition of claim 7, wherein the non-silicon-containing component further comprises decanol.

9. The polymerizable silicone hydrogel contact lens precursor composition of claim 8, wherein the decanol is present in an amount from about 5% (w/w) to about 30% (w/w) of the composition.

10. The polymerizable silicone hydrogel contact lens precursor composition of claim 7, further comprising a block copolymer of polydimethylsiloxane and polyethylene glycol.

11. The polymerizable silicone hydrogel contact lens precursor composition of claim 7, further comprising a hydrophilic silicone-containing demolding aid or a polyalkylene oxide demolding aid.

12. The polymerizable silicone hydrogel contact lens precursor composition of claim 7, wherein the non-silicon-containing component further comprises a diluent selected from the group consisting of hexanol, ethoxyethanol, isopropanol, propanol, decanol, and combinations thereof.

13. The polymerizable silicone hydrogel contact lens precursor composition of claim 12, further comprising units of a methacrylate phosphorylcholine-monomer.

14. The polymerizable silicone hydrogel contact lens precursor composition of claim 1, further comprising an extractable hydrophobic additive or an extractable amphiphilic additive.

15. The polymerizable silicone hydrogel contact lens precursor composition of claim 14, wherein the additive is ethylene glycol stearate, diethylene glycol monolaurate, a $C_2$-$C_{24}$ alcohol, a $C_2$-$C_{24}$ amine, or polydimethylsiloxane co-PEG, or combinations thereof.

16. The polymerizable silicone hydrogel contact lens precursor composition of claim 15, wherein the additive is decanol, or polydimethylsiloxane-co-PEG, or combinations thereof.

17. The polymerizable silicone hydrogel contact lens precursor composition of claim 16, wherein the additive comprises polydimethylsiloxane-co-PEG having a molecular weight in a range of about 300 to about 30,000 Daltons.

18. The polymerizable silicone hydrogel contact lens precursor composition of claim 16, wherein the additive comprises polydimethylsiloxane-co-PEG having a molecular weight of less than about 3,000 Daltons.

19. The polymerizable silicone hydrogel contact lens precursor composition of claim 14, wherein the additive is present in an amount in a range of about 1% to about 60% (w/w) of the composition.

20. The polymerizable silicone hydrogel contact lens precursor composition of claim 14, comprising at least two different additives.

21. The polymerizable silicone hydrogel contact lens precursor of claim 1, wherein the polymerizable silicone hydrogel contact lens precursor composition comprises at least two reactive components that comprise monomer types with different reactivity ratios.

22. The polymerizable silicone hydrogel contact lens precursor composition of claim 1, wherein the polymerizable non-silicon-containing component comprises a hydrophilic vinyl-containing monomer.

23. The polymerizable silicone hydrogel contact lens precursor composition of claim 1, wherein the portion of the polymerizable silicone hydrogel contact lens precursor composition being removable from a polymerized silicone hydrogel contact lens product produced from the polymerizable silicone hydrogel contact lens precursor composition is present in an amount of at least 15% (w/w) of the polymerized silicone hydrogel contact lens product, and said portion has unreacted monomer, partially reacted monomer, or both in an amount that is at least 15% (w/w) based on the weight of the polymerized silicone hydrogel contact lens product.

24. A silicone hydrogel contact lens, comprising:
a lens body comprising a silicone hydrogel material, the lens body having an ophthalmically acceptable surface wettability and a dry weight no greater than 90% of the dry weight of the lens body prior to extraction, wherein said lens body had at least 15% (w/w) extractables removed by extraction based on the dry weight of the lens body prior to extraction, and said extractables have unreacted monomer, partially reacted monomer, or both, in an amount that is at least 15% (w/w/) based on the dry weight of the lens body prior to extraction, and wherein the lens body is a cast molded element obtained from a non-polar resin contact lens mold.

25. The silicone hydrogel contact lens of claim 24, wherein the lens body is free of a surface treatment that provides an ophthalmically acceptable surface wettability.

26. The silicone hydrogel contact lens of claim 24, wherein the lens body is free of an interpenetrating polymer network of a polymeric wetting agent that provides an ophthalmically acceptable surface wettability.

27. The silicone hydrogel contact lens of claim 24, wherein the lens body is hydrated and comprises an advancing contact angle less than about 120 degrees, a tensile modulus less than about 1.6 MPa, an ionoflux less than about $7 \times 10^{-3}$ mm$^2$/min, an oxygen permeability of at least about 70 barrers, or a water content of at least about 30% by weight, or combinations thereof.

28. The silicone hydrogel contact lens of claim 24, wherein the lens body comprises units obtained from a methacrylate phosphorylcholine-monomer.

29. The silicone hydrogel contact lens of claim 28, wherein the lens body comprises units obtained from 2-methacryloyloxyethyl phosphorylcholine.

30. The silicone hydrogel contact lens of claim 24, wherein the lens body has an equilibrium water content from about 35% to about 65%.

31. The silicone hydrogel contact lens of claim 24, wherein said lens body is a polymerization product of a polymerizable composition comprising at least two reactive components that comprise monomer types with different reactivity ratios.

32. The silicone hydrogel contact lens of claim 24, wherein said extraction is achieved with a liquid extraction media that is an alcohol.

33. The silicone hydrogel contact lens of claim 24, wherein said extraction is achieved with a liquid extraction media that is chloroform.

34. The silicone hydrogel contact lens of claim 24, wherein said silicone hydrogel material comprises a hydrophilic vinyl-containing monomer.

35. A silicone hydrogel contact lens, comprising:
a lens body comprising a silicone hydrogel material, the lens body having an ophthalmically acceptable surface wettability and a dry weight no greater than 90% of the dry weight of the lens body prior to extraction, wherein said lens body had at least 10% (w/w) extractables removed by extraction based on the dry weight of the lens body prior to extraction, and said extractables have unreacted monomer, partially reacted monomer, or both, in an amount that is at least 10% (w/w/) based on the dry weight of the lens body prior to extraction, and wherein the lens body is a cast molded element obtained from a non-polar resin contact lens mold, wherein said silicone hydrogel material comprises a hydrophilic vinyl-containing monomer.

36. The polymerized silicone hydrogel contact lens product of claim 35, wherein the pre-extracted body member has a removable component content from 10% (w/w) to about 75% (w/w) of the body member.

37. The silicone hydrogel contact lens of claim 35, wherein the lens body has an equilibrium water content from about 35% to about 65%.

38. The silicone hydrogel contact lens of claim 35, wherein the lens body is a polymerization product of a polymerizable composition comprising at least two reactive components that comprise monomer types with different reactivity ratios.

39. The silicone hydrogel contact lens of claim 35, wherein the lens body is free of a surface treatment that provides an ophthalmically acceptable surface wettability.

40. The silicone hydrogel contact lens of claim 35, wherein the lens body is free of an interpenetrating polymer network of a polymeric wetting agent that provides an ophthalmically acceptable surface wettability.

41. The silicone hydrogel contact lens of claim 35, wherein the lens body is hydrated and comprises an advancing contact angle less than about 120 degrees, a tensile modulus less than about 1.6 MPa, an ionoflux less than about 7 $10^{-3}$ mm$^2$/min, an oxygen permeability of at least about 70 barrers, or a water content of at least about 30% by weight, or combinations thereof.

42. The silicone hydrogel contact lens of claim 35, wherein said extraction is achieved with a liquid extraction media that is an alcohol.

43. The silicone hydrogel contact lens of claim 35, wherein said extraction is achieved with a liquid extraction media that is chloroform.

44. The silicone hydrogel contact lens of claim 35, wherein the lens body comprises units obtained from a methacrylate phosphorylcholine-monomer.

45. The silicone hydrogel contact lens of claim 44, wherein the lens body comprises units obtained from 2-methacryloyloxyethyl phosphorylcholine.

46. A pre-extracted polymerized silicone hydrogel contact lens product, comprising:
a pre-extracted body member having a dry weight at least 10% greater than the dry weight of the body member after subjecting the body member to an extraction procedure to form an extracted polymerized silicone hydrogel contact lens product, wherein said pre-extracted body member has at least 10% (w/w) extractables removable by extraction based on the dry weight of the body member prior to extraction, and said extractables have unreacted monomer, partially reacted monomer, or both in an amount that is at least 10% (w/w/) based on the dry weight of the body member prior to extraction, and wherein the pre-extracted body member is a cast molded element obtained from a non-polar resin contact lens mold, wherein said pre-extracted body member is a polymerization product of a polymerizable composition comprising at least two reactive components that comprise monomer types with different reactivity ratios.

47. A method for producing a silicone hydrogel contact lens, comprising:
forming a silicone hydrogel contact lens body having a dry weight no greater than 90% of the dry weight of the lens body prior to extraction and an ophthalmically acceptable surface wettability from a pre-extracted silicone hydrogel contact lens product having a removable component content of at least 10% (w/w) of the lens product, wherein said removable component content has unreacted monomer, partially reacted monomer, or both in an amount that is at least 10% (w/w) based on the dry weight of the silicone hydrogel contact lens body, and wherein the lens body is a cast molded element obtained from a non-polar resin contact lens mold.

48. The method of claim 47, wherein the forming comprises extracting extractables from the pre-extracted silicone hydrogel contact lens product.

49. The method of claim 47, further comprising curing a polymerizable silicone hydrogel contact lens precursor composition to form a pre-extracted polymerized silicone hydrogel contact lens product having a removable component content of at least 10% (w/w) of the lens product.

50. The method of claim 49, further comprising adding a removable additive to the polymerizable silicone hydrogel contact lens precursor composition.

51. The method of claim 50, wherein the removable additive is selected from the group consisting of compatibilizers, demolding aids, delensing aids, wettability enhancers, modulus reducers, ionoflux reducers, and combinations thereof.

52. The method of claim 49, further comprising adding an agent selected from the group consisting of an ultraviolet absorber, a tinting agent, and combinations thereof, to the lens precursor composition.

53. The method of claim 49, wherein the polymerizable silicone hydrogel contact lens precursor composition comprises a hydrophilic vinyl-containing monomer.

54. The method of claim 47, wherein the silicone hydrogel contact lens is produced without surface treating the lens or forming the lens with an interpenetrating polymer network of a polymeric wetting agent.

55. The method of claim 47, wherein said silicone hydrogel contact lens is a polymerization product of a polymerizable composition comprising at least two reactive components that comprise monomer types with different reactivity ratios.

56. The method of claim 47, wherein the pre-extracted silicone hydrogel contact lens product has a removable component content of at least 15% (w/w) of the lens product, and said removable component content has unreacted monomer, partially reacted monomer, or both in an amount that is at least 15% (w/w) based on the dry weight of the silicone hydrogel contact lens body.

* * * * *

UNITED STATES PATENT AND TRADEMARK OFFICE
CERTIFICATE OF CORRECTION

PATENT NO. : 8,231,218 B2  
APPLICATION NO. : 11/761332  
DATED : July 31, 2012  
INVENTOR(S) : Hong et al.

Page 1 of 1

It is certified that error appears in the above-identified patent and that said Letters Patent is hereby corrected as shown below:

IN THE CLAIMS:

Claim 4, Column 55, Lines 15 and 16, "poly(ethyleneglycol)propylmethylsiloxane); dimethacryloyl silicone-containing macromer," should read --poly(ethyleneglycol)propylmethylsiloxane),--.

Claim 7, Column 55, Lines 32 and 33, "poly(ethyleneglycol)propylmethylsiloxane); dimethacryloyl silicone-containing macromer," should read --poly(ethyleneglycol)propylmethylsiloxane),--.

Claim 35, Column 57, Line 33, "(w/w/)" should read --(w/w)--.

Signed and Sealed this  
Twenty-fourth Day of December, 2013

Margaret A. Focarino  
*Commissioner for Patents of the United States Patent and Trademark Office*